United States Patent
Marrelli et al.

(10) Patent No.: US 10,055,431 B2
(45) Date of Patent: *Aug. 21, 2018

(54) DATA QUALITY ANALYSIS AND CLEANSING OF SOURCE DATA WITH RESPECT TO A TARGET SYSTEM

(71) Applicant: International Business Machines Corporation, Armonk, NY (US)

(72) Inventors: Carl M. Marrelli, Westerville, OH (US); Ram S. Narayanan, Canton, MI (US); Martin Oberhofer, Bondorf (DE); Solmaz Rashidi, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 571 days.

This patent is subject to a terminal disclaimer.

(21) Appl. No.: 14/692,269

(22) Filed: Apr. 21, 2015

(65) Prior Publication Data

US 2016/0070725 A1   Mar. 10, 2016

Related U.S. Application Data

(63) Continuation of application No. 14/479,432, filed on Sep. 8, 2014, now Pat. No. 9,600,504.

(51) Int. Cl.
*G06F 17/00* (2006.01)
*G06F 17/30* (2006.01)

(52) U.S. Cl.
CPC .... *G06F 17/30303* (2013.01); *G06F 17/3053* (2013.01); *G06F 17/30914* (2013.01)

(58) Field of Classification Search
CPC ............... G06F 17/30; G06F 17/3053; G06F 17/30914; G06F 17/30144; G06F 17/30303
(Continued)

(56) References Cited

U.S. PATENT DOCUMENTS 7,251,578 B1   7/2007   Chen et al.
7,676,522 B2   3/2010   Klein et al.
(Continued)

OTHER PUBLICATIONS

Baskarada et al., "Towards a Capability Maturity Model for Information Quality Management: A TDQM Approach", Nov. 2006, 12 pages.
(Continued)

*Primary Examiner* — Isaac M Woo
(74) *Attorney, Agent, or Firm* — Susan Murray; Edell, Shapiro & Finnan, LLC

(57) ABSTRACT

A system transfers data between source systems and a target system. The system determines a domain score for data domains of source data from the source systems based on data quality metrics for the target system. The domain score indicates data quality with respect to the target system. Corresponding processes of the target system are identified for the data domains, and a process score is determined for the identified processes based on a corresponding domain score. The process score indicates data quality with respect to the identified processes. The system cleanses the source data based on the domain score and/or process score, and validates the cleansed source data against the target system for transference. Embodiments of the present invention further include a method and computer program product for transferring data between source systems and a target system in substantially the same manner described above.

7 Claims, 14 Drawing Sheets

(58) Field of Classification Search
USPC .................................................. 707/600–899
See application file for complete search history.

(56) References Cited

U.S. PATENT DOCUMENTS

| | | |
|---|---|---|
| 7,711,660 B1 | 5/2010 | Gentile et al. |
| 7,779,051 B2 | 8/2010 | Friedlander et al. |
| 2006/0235715 A1 | 10/2006 | Abrams et al. |
| 2006/0235899 A1 | 10/2006 | Tucker |
| 2007/0198312 A1 | 8/2007 | Bagchi et al. |
| 2008/0195430 A1 | 8/2008 | Rustagi |
| 2008/0195440 A1 | 8/2008 | Bagchi et al. |
| 2008/0235288 A1 | 9/2008 | Ben Harush |
| 2009/0319566 A1 | 12/2009 | Wald et al. |
| 2010/0005346 A1 | 1/2010 | Hamlescher et al. |
| 2010/0070893 A1 | 3/2010 | Schreck et al. |
| 2010/0312737 A1* | 12/2010 | Coldicott .......... G06F 17/30289 706/45 |
| 2012/0330911 A1 | 12/2012 | Gruenheid et al. |

OTHER PUBLICATIONS

"The IBM Data Governance Council Maturity Model: Building a roadmap for effective data governance", IBM Data Governance Council Maturity Model—LO11960-USEN-00_10.12, Oct. 2007, 16 pages.

"Putting Metadata to Work to Achieve the Goals of Data Governance", export_wwwroot_informationmgmt_03_data_media_pdfs_informatica_metadata_towork—Putting Metadata to Work, Informatica, Jan. 2006, 16 pages.

List of IBM Patents or Patent Applications Treated as Related, Apr. 21, 2015.

* cited by examiner

DATA DOMAIN I

| | VALIDITY | CONSISTENCY | COMPLETENESS | OBSOLESCENCE | PRECISION | ACCURACY | TOTAL CLEAN |
|---|---|---|---|---|---|---|---|
| DATA ATTRIBUTE A | % | % | % | % | % | % | %A |
| DATA ATTRIBUTE B | % | % | % | % | % | % | %B |
| DATA ATTRIBUTE C | % | % | % | % | % | % | %C |
| DATA ATTRIBUTE D | % | % | % | % | % | % | %D |
| DATA ATTRIBUTE E | % | % | % | % | % | % | %E |
| DATA ATTRIBUTE F | % | % | % | % | % | % | %F |

QUALITY DIMENSION

LOAD OBJECT BASED DATA QUALITY

| IMPACTED LOAD OBJECTS | SOURCE DATA HEALTH |
|---|---|
| LOAD OBJECT 1 | 64% |
| LOAD OBJECT 2 | 73% |
| ⋮ | ⋮ |

FIG.12

DATA QUALITY ANALYSIS AND CLEANSING OF SOURCE DATA WITH RESPECT TO A TARGET SYSTEM

CROSS-REFERENCE TO RELATED APPLICATIONS

This application is a continuation of U.S. patent application Ser. No. 14/479,432, entitled "DATA QUALITY ANALYSIS AND CLEANSING OF SOURCE DATA WITH RESPECT TO A TARGET SYSTEM" and filed Sep. 8, 2014, the disclosure of which is incorporated herein by reference in its entirety.

BACKGROUND

1. Technical Field

Present invention embodiments relate to data migration between source and target systems, and more specifically, to data quality analysis and cleansing of data from one or more source systems with respect to business or other processes of a target system for migration of the data from the one or more source systems to the target system.

2. Discussion of the Related Art

A major effort in a large data transformation project is preparing data within source systems for transformation into a target system or environment. Cleansing activities are often employed prior to the data transformation in order to avoid moving dirty or problematic data into the target environment. However, quantifying the level of data quality within each source system for cleansing is complex, and further complicated when the data quality is to be determined across all source systems containing data to be migrated. Moreover, the data required for business processes on the target system that is absent from the source systems may be unknown. This leads to missed opportunities to cleanse and harmonize data earlier in the transformation process, thereby leading to poor data quality that results in business process interruptions and costly delays to project timelines. The resulting poor data quality applies to first time transformations, and is even more applicable for multiple transformations, where the target system is well defined.

Large transformation projects rely heavily on data from source systems to support business processes within a future-state Enterprise Resource Planning (ERP) system. When implementing new enterprise software (e.g., Customer Relationship Management (CRM), etc.), a business analyst decides the data to migrate (and the data to retire) from source systems, determines the data that needs to be maintained for legal requirements, and whether the quality of data is sufficient. Further, industry-strength Enterprise Resource Planning (ERP) systems have strict requirements for incoming data that are often not established in the source environment. Extensive time and expertise is required to determine that the data to be migrated properly supports the execution of critical business processes.

SUMMARY

According to one embodiment of the present invention, a system transfers data between one or more source systems and a target system. The system includes at least one processor and determines a domain score for one or more data domains of source data from the one or more source systems based on one or more data quality metrics for the target system. The domain score provides an indication of data quality of the source data with respect to the target system. One or more corresponding processes of the target system are identified for the one or more data domains, and a process score is determined for the one or more identified processes based on a corresponding domain score. The process score indicates data quality of the source data with respect to the identified processes. The system further cleanses the source data based on one or more from a group of the domain score and process score, and validates the cleansed source data against the target system for transference to the target system. Embodiments of the present invention further include a method and computer program product for transferring data between one or more source systems and a target system in substantially the same manner described above.

BRIEF DESCRIPTION OF THE SEVERAL VIEWS OF THE DRAWINGS

Generally, like reference numerals in the various figures are utilized to designate like components.

FIG. 5 is an illustration of an example matrix providing scores for data quality metrics of data domain attributes of a source system according to an embodiment of the present invention.

FIG. 12 is a graphical schematic illustration of an example visualization providing data quality analysis results for load objects according to an embodiment of the present invention.

DETAILED DESCRIPTION

Embodiments of the present invention perform data quality analysis of data from one or more source systems to provide cleansed data to a target system that properly supports the execution of business or other target system processes. Present invention embodiments compare data elements expected in the target system against corresponding data elements of one or more source systems and produce weighted data quality metrics that are meaningful to resources accountable for cleansing and transformation of the source data elements.

Embodiments of the present invention provide a process-focused view of source data in correlation with a required target configuration. When data cleansing is performed from a source system perspective (independently of the eventual target state), an unfocused set of activities commences often leading to wasted effort with respect to cleansing data that is not truly needed to support future-state business or other processes of a target system. Moreover, data required for migration from a source system to a target system is often missed, thereby leading to reactive data cleansing late in a transformation effort that is expensive and risky since this puts deadlines (e.g., dates for live production, etc.) at risk.

Present invention embodiments provide a future-state focus on the cleansing effort by identifying key target data requirements that are linked to target business or other processes and key performance indicators (KPI), mapping these back to each source system, and placing weighted importance on the cleansing activities. Essentially, present invention embodiments provide information necessary to understand data quality, relevancy, and scope for data quality initiatives of the target system.

The data quality analysis and cleansing of present invention embodiments includes a source analysis phase, a target process phase, and a load analysis phase. The source analysis phase enables identification of data for cleansing and the manner and location within the migration process for performing the data cleansing. The data quality analysis is performed from the perspective of the target system. An action plan is generated based on the data analysis to provide data and cleansing recommendations. The target process phase associates data to business or other processes in the target system, and provides a data quality indication for data utilized by those processes (or the impact of the source data to those processes). This enables selection of certain processes with sufficiently clean data to be tested. The load analysis phase validates data prior to loading within the target system, and provides an indication of compliance of the data with target system requirements.

Figure 1:
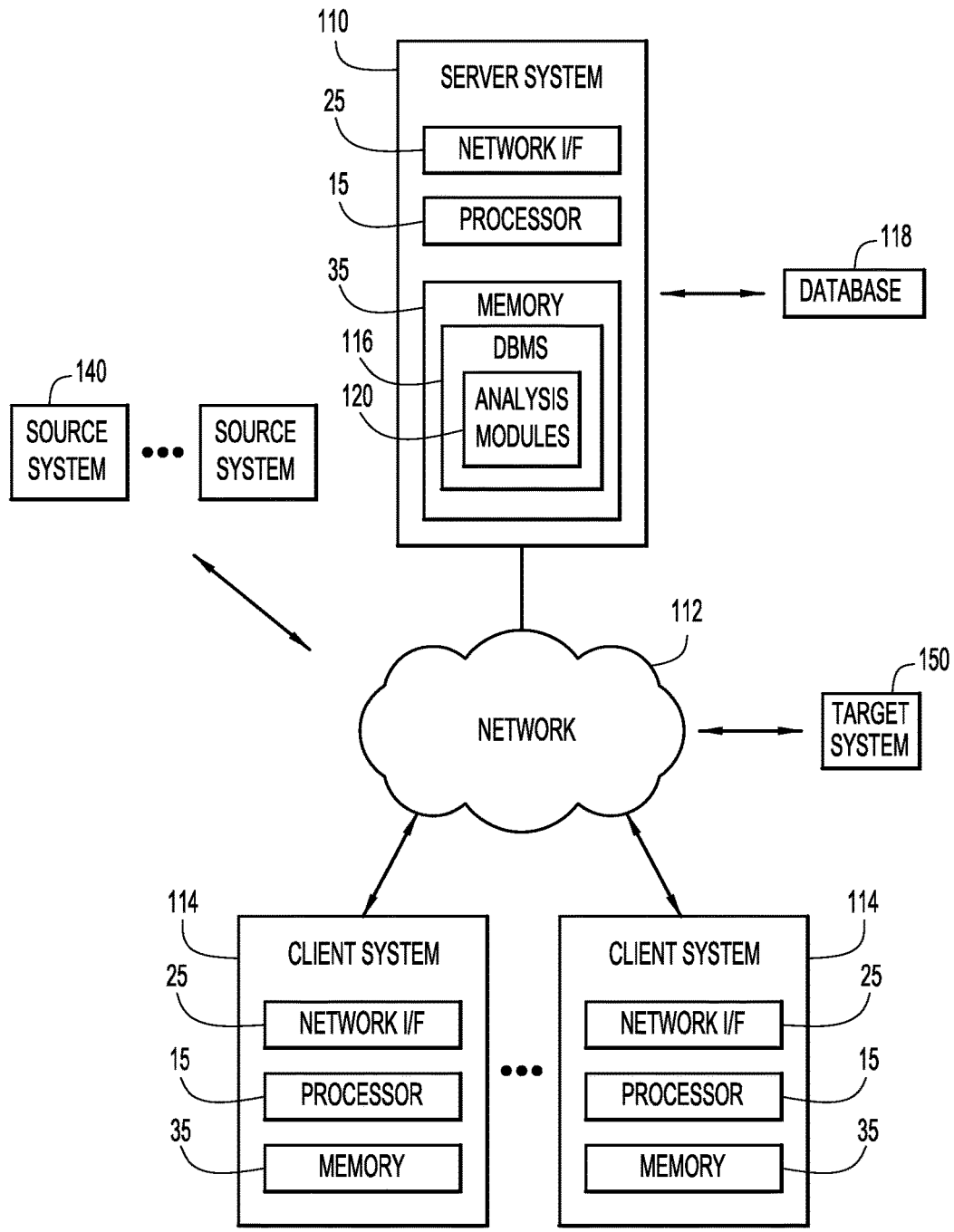
FIG. 1 is a diagrammatic illustration of an example computing environment for use with an embodiment of the present invention.

An example environment for use with present invention embodiments is illustrated in FIG. 1. Specifically, the environment includes one or more server systems 110, one or more client or end-user systems 114, one or more source systems 140, and a target system 150. Server systems 110, client systems 114, source systems 140, and/or target system 150 may be remote from each other and communicate over a network 112. The network may be implemented by any number of any suitable communications media (e.g., wide area network (WAN), local area network (LAN), Internet, Intranet, etc.). Alternatively, server systems 110, client systems 114, source systems 140, and/or target system 150 may be local to each other, and communicate via any appropriate local communication medium (e.g., local area network (LAN), hardwire, wireless link, Intranet, etc.).

Client systems 114 enable users to communicate with server systems 110 to perform data quality analysis, cleansing, and transformation for migration of data from source systems 140 to target system 150. The server systems include a database management system 116 including analysis modules 120 to perform the data quality analysis, data cleansing, data transformations, and data migration as described below. Database management system 116 may include a database 118 to store various information for the data quality analysis, data cleansing, data transformations, and/or data migration (e.g., cleansing data, transformation data, matrices, data quality metric scores, data from the source systems, data models, etc.). The database may be local to or remote from server systems 110, and may communicate via any appropriate communication medium (e.g., local area network (LAN), wide area network (WAN). Internet, hardwire, wireless link, Intranet, etc.). Database management system 116 (and database 118) may be implemented by any conventional or other database system, and may include conventional or other Extract, Transform, Load (ETL) tools to migrate data from source systems 140 to target system 150 in accordance with present invention embodiments.

The client systems may present a graphical user (e.g., GUI, etc.) or other interface (e.g., command line prompts, menu screens, etc.) to solicit information from users pertaining to the desired data quality analysis, data cleansing, data transformations, and/or data migration, and may provide reports including data quality analysis results (e.g., data quality scores, action plans with recommended cleansing actions and data identified for cleansing, etc.) as described below.

Server systems 110 and client systems 114 may be implemented by any conventional or other computer systems preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, database management system, analysis modules, browser/interface software, etc.).

Database management system 116 and analysis modules 120 may include one or more modules or units to perform the various functions of present invention embodiments described below. The various modules (e.g., database management system, analysis modules, etc.) may be implemented by any combination of any quantity of software and/or hardware modules or units, and may reside within memory 35 of the server and/or client systems for execution by processor 15.

Similarly, source systems 140 and target system 150 may be implemented by any conventional or other computer systems preferably equipped with a display or monitor, a base (e.g., including at least one processor, one or more memories and/or internal or external network interfaces or communications devices (e.g., modem, network cards, etc.)), optional input devices (e.g., a keyboard, mouse or other input device), and any commercially available and custom software (e.g., communications software, data management software, application software, etc.). By way of example, source systems 140 may be implemented by any suitable data systems (e.g., a data management system, an Enterprise Resource Planning (ERP) system, a data warehouse system, etc), while target system 150 may be implemented by any suitable enterprise or other system, preferably including rules or requirements for data (e.g., a Master Data Management (MDM) system, a Customer Relationship Management (CRM) system, an Enterprise Resource Planning (ERP) system, a data warehouse system, etc.).

Figure 2:
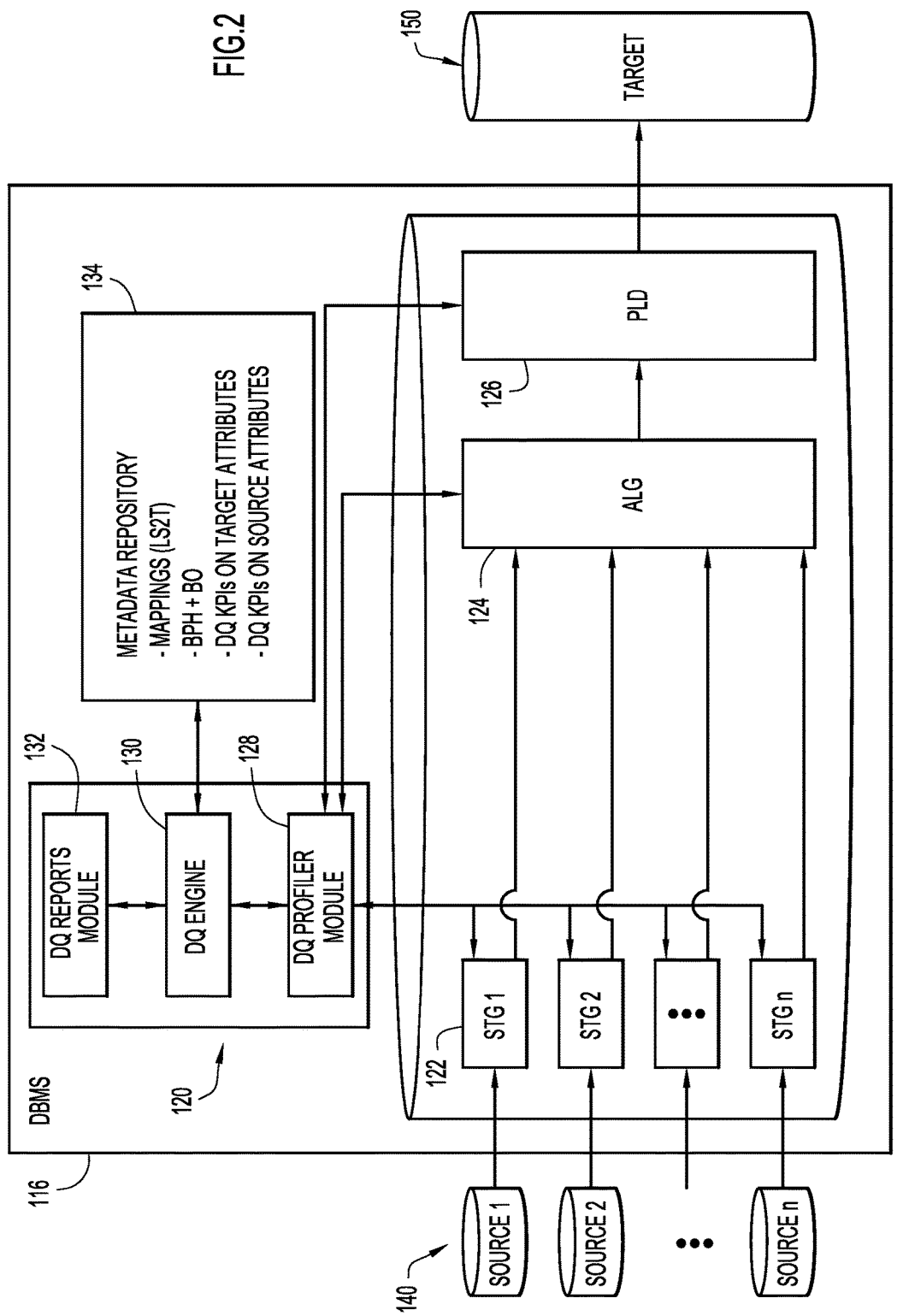
FIG. 2 is a diagrammatic illustration of modules of a database management system for performing data quality analysis according to an embodiment of the present invention.

Referring to FIG. 2, data migration projects typically include one or more source systems 140 and target system 150. Data is harmonized across source systems 140 and cleansed to fulfill data quality requirements for business or other processes of target system 150 and/or to satisfy key performance indicators (KPI) necessary for the target system. The data usually resides in database 118 of database management system 116 during migration (e.g., via the ETL tool) from source systems 140 to target system 150, while data cleansing is developed and applied during the various phases of present invention embodiments. The data may be grouped logically within database 118 in any desired fashion.

By way of example, database management system 116 may manage (within database 118) one or more staging (STG) areas 122, an alignment (ALG) area 124, and a preload (PLD) area 126 to transfer data from source systems 140 to target system 150. Each staging area 122 is associated with a corresponding source system 140, and receives and stores data from the corresponding source system. The data model of each staging area 122 mirrors the data model of the corresponding source system.

Alignment area 124 receives and stores data of source systems 140 from each staging area 122 (associated with a corresponding source system 140). The alignment area includes a common data model to receive data from each of the staging areas (and corresponding source systems 140). The common data model of the alignment area is derived from the data model of target system 150. However, the common data model varies slightly from the data model of the target system in order to enable source data records to be processed by a common cleansing process. The data from staging areas 122 is transformed for transference to alignment area 124.

Preload area 126 includes a data model that mirrors the data model of target system 150, and stores data from alignment area 124 for loading into the target system. Minor transformations are performed on the data from the alignment area since the common data model of the alignment area varies slightly from the data model of the target system (and of the preload area).

This arrangement of data provides several advantages. For example, development of common data cleansing applied in the alignment area to records of each of the source systems in a common data model reduces development time and cost. Further, compliance with target data quality requirements may be measured against the records in the alignment and preload areas.

Database management system 116 further includes data quality profiler module 128, data quality engine 130, and data quality reports module 132 (of analysis modules 120), and a metadata repository 134 to perform the data quality analysis based on data within the staging, alignment, and preload areas 122, 124, 126. In particular, data quality profiler module 128 and data quality engine 130 include data quality rules, where data quality profiler module 128 measures the level of data quality by comparing data values and/or data formats against each data quality rule. Data quality engine 130 computes results based on the comparisons that are aggregated on various levels (e.g., by table, by business object, across multiples sources, business process hierarchies, etc.), weighted, and stored. Data quality reports module 132 accesses and presents the results of the data quality engine.

Metadata repository 134 stores information for performance of the data quality analysis. For example, the metadata repository may store data requirements for in-scope (or relevant) data of the target system, an association of data objects to business or other processes of the target system (e.g., business process hierarchy (BPH) and business objects (BO)), logical source to target mappings (LS2T) from each target data field to one or more corresponding source data fields, data quality key performance indicators (KPI) for source and target attributes used for weighting, relationships between business or other processes and data domains, and the decomposition of each data domain into technical tables and attributes. The metadata repository may be implemented by any quantity of any conventional or other repository or storage unit storing any portion of the information.

The business process hierarchy (BPH) describes the manner in which business or other processes are organized on target system 150. A tool may be utilized to decompose the business or other processes of target system 150 (based on the business process hierarchy (BPH)) and associate data attributes with those processes.

The logical source to target (LS2T) mappings describe the manner in which logical attributes from the source system are associated with logical attributes of the target system (for each pairing of a source system to the target system). A technical specification for each mapping (generated based on the logical mappings) describes the manner in which physical attributes of the source data models of staging areas 122 are mapped to the common physical data model (derived from the target system) employed as a baseline for alignment area 124. These mappings enable tracing of attributes from the target system back to one or more source systems and, therefore, allow correlation between source data quality metrics and target data quality metrics. For example, a source system field corresponding to a target system field may be determined by tracing the target system field back from preload area 126 (e.g., employing the target data model) to a field of alignment area 124 (e.g., employing the common data model derived from the target data model). The mappings (LS2T) may subsequently be used to determine the field in each source system (or staging areas 122 employing the data models of the source systems) that corresponds to the traced field in the alignment area. The (LS2T) mappings may be pre-defined by a user, or generated by a conventional or other computerized tool.

Figure 3:
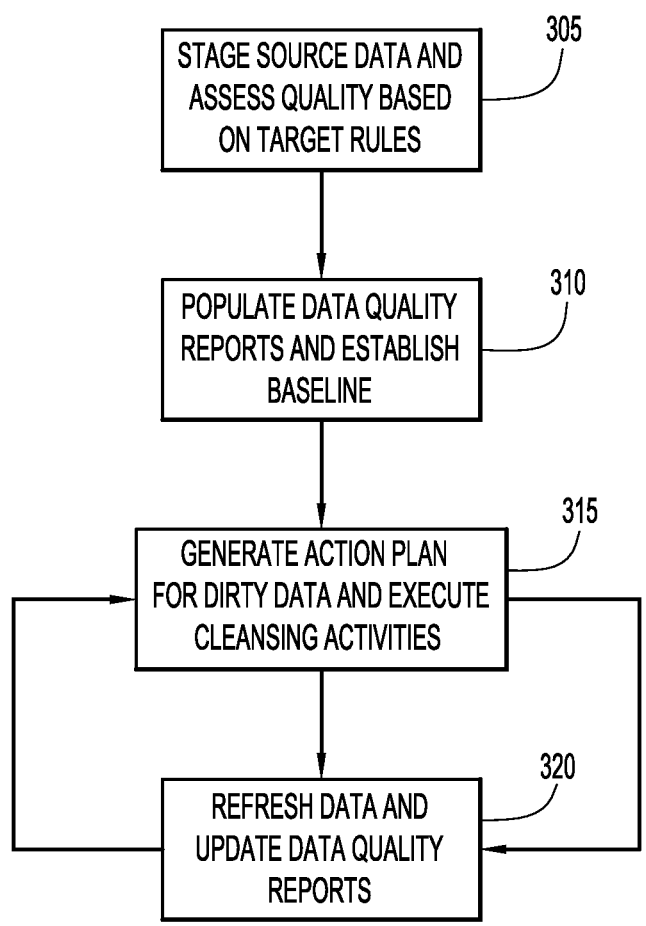
FIG. 3 is a flow diagram illustrating a manner of analyzing quality of source data for a target system according to an embodiment of the present invention.

A manner of performing the source analysis phase of data quality analysis providing data quality measures for source data within staging areas 122 (e.g., via data quality profiler module 128, data quality engine 130, data quality reports module 132, and one or more server systems 110) according to an embodiment of the present invention is illustrated in FIG. 3. Initially, source data within database management system 116 (e.g., staging areas 122) is organized by data domains (e.g., Customer Master, Material Master, Supplier Master, etc.). The data domains each include a set of tables with one or more rows (or records) and one or more columns. Each row includes one or more fields or data attributes each associated with a corresponding column. For example, a table of a data domain may include a row (or record) for each customer, where the columns or data attributes for each row may include first name, last name, and address. Data attributes of a data domain include in-scope data attributes that are relevant to a future-state target environment (e.g., critical to one or more business or other processes of the target system, required by the target system, etc) and considered for data cleansing (e.g., provided with a non-zero weight as described below). Data attributes of the data domain that are not relevant in the target environment (e.g., not critical to a business or other process of the target system, not required by the target system, etc.) are obviated for data cleansing (e.g., provided with a zero weight as described below).

During the source analysis phase, data from source systems 140 is staged in staging areas 122, profiled, and assessed based on target system requirements and mappings by data quality profiler module 128 and data quality engine 130. Actionable or problematic data is prioritized by business criticality and routed to appropriate users and/or administrators by data quality reports module 132. The actionable data is either cleansed in the source systems, or the mappings are updated with conversion rules. This source analysis phase may be repeated until data is sufficiently cleansed for the target system.

Specifically, data from source systems 140 (FIG. 2) is received and stored in corresponding staging areas 122 for data quality assessment based on data quality rules for the target system at step 305. Data quality profiler module 128 utilizes a commercial data profiling tool to read data from source systems 140, create staging areas 122 based on the data models from the source systems, and move the data from the source systems to those staging areas. Business metadata may be utilized by data quality profiler module 128 to direct the data profiling tool to extract and create staging areas 122 for specific data within source systems 140. For example, the business metadata may indicate which data from the source systems are critical to business or other processes of the target system or are required by the target system. In this case, data quality profiler module 128 may initiate extraction and creation of staging areas 122 for data critical to and/or required by the target system.

Figure 4:
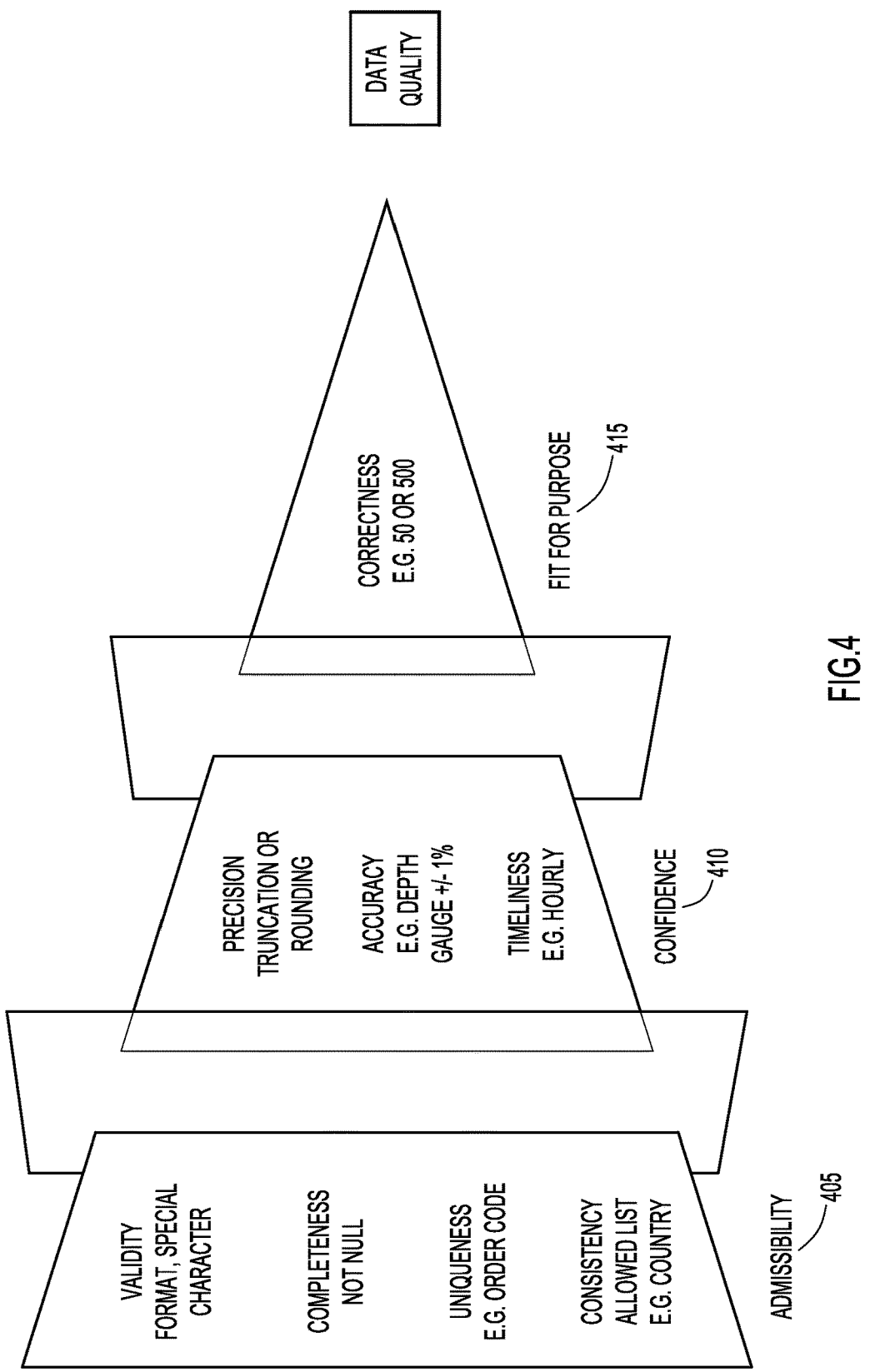
FIG. 4 is a diagrammatic illustration of example data quality metrics employed for analyzing quality of source data according to an embodiment of the present invention.

The data quality of the source data in staging areas 122 is measured relative to each of one or more data quality dimensions. Referring to FIG. 4, data quality dimensions may include, by way of example, an admissibility dimension 405, a confidence dimension 410, and a fit for purpose dimension 415. Admissibility dimension 405 may include metrics pertaining to validity (e.g., data format, special character, etc.), completeness of data (e.g., no null values, etc.), uniqueness (e.g., order or other code, etc.), and consistency (e.g., a list of allowed or permitted data, etc.). Confidence dimension 410 may include metrics pertaining to precision (e.g., truncation or rounding, etc.), accuracy (e.g., error within a certain percentage, etc.), and timeliness (e.g., recency of data (e.g., hourly, etc.)). Fit for purpose dimension 415 may pertain to correctness (e.g., 50 instead of 500, etc.). However, any quantity of any data quality dimensions may be utilized, and the data quality dimensions may pertain to requirements for any systems (e.g., source systems 140, target system 150, etc.).

The data quality measurements may be accomplished via various conventional or commercially available data quality platforms. In particular, each data attribute of a data domain is associated with a set of data quality rules for each of source systems 140, and for a corresponding data attribute of target system 150. The set of data quality rules typically span the data quality dimensions. These data quality rules may be pre-defined by a user. For example, a set of data quality rules for a data attribute of the target system may include a completeness rule (e.g., the data attribute must not be nill), a validity rule (e.g., the data attribute must not contain special characters), and an accuracy rule (e.g., the data attribute must be a valid street name for a given zip code). Similar sets of data quality rules may be employed with respect to source systems 140.

Data quality profiler module 128 (e.g., via one or more server systems 110) applies the associated sets of data quality rules (for source systems 140 and corresponding data attributes of target system 150) and (LS2T) mappings to the corresponding data attributes of the source systems to determine compliance of the data attributes with those source and target system rules. A record containing the data attribute is considered actionable or problematic (e.g., dirty) with respect to a source or target system when the (LS2T) mappings and/or at least one of the data quality rules in an associated set for the source or target systems are violated.

The records of the source systems are designated with a status according to results of application of the (LS2T) mappings and sets of data quality rules (for the source and target systems) to the corresponding data attributes of those data records. The statuses of the records may be utilized to generate an action plan or report specifying actionable or problematic data records as described below. By way of example, the statuses include:

Dirty, Action needed in source—this status indicates that the value of a data attribute within a data record does not adhere to source system business or other data quality rules, and data cleansing of the data attribute at the source system is needed prior to migration of the data record to the target system. Data records designated with this status are placed within an action plan for data cleansing at the source system;

Dirty, Missing in source—this status indicates that a data attribute of a data record is required in the target system but does not exist in the source system, and data creation (e.g., using default values, third enrichment sources, etc.) or harmonization is needed prior to migration of the data record to the target system. Data records designated with this status are placed in an action plan for population or creation of the missing data at the source system or for automated conversion rule creation;

Fit for use, Conversion needed—this status indicates that the value of the data attribute of a data record complies with source system data quality rules, but not with target system data quality rules and, therefore, requires conversion. The data attribute of the data record is considered clean in the source system, but needs conversion to be clean in the target system. Conversion rules would be created (e.g., automatically or by a user and/or administrator) to handle these data records;

Fit for use, adheres to target standards/configuration—this status indicates that the value of a data attribute in a data record complies with source system data quality rules and the requirements of the target system, and no action is required;

Unknown, Mapping missing—this status indicates that a data attribute of a data record of a source system has not been identified for the target system. These data records are routed to users and/or administrators responsible for mapping data from the source systems to the target system.

These statuses may be determined during the source analysis phase for data records with data attributes deemed business critical, during the target process phase for data records with data attributes required for in-scope (or relevant) business processes, and in the load analysis phase for data records with data attributes of in-scope (or relevant) data domains. However, the statuses may be determined for any desired data records with any data attributes. Further, a data record may be associated with one or more of these statuses each associated with a corresponding data attribute. For example, a data record with a data attribute problematic in the source system and another data attribute problematic in the target system may be designated with the statuses of Dirty, Action needed in source and Fit for use, Conversion needed.

An action plan may be generated with data records, statuses for the data record attributes, data quality rules (for the source and target systems) violated and reasons for the violation, and recommended cleansing actions as described below.

In addition, weights may be assigned to data attributes of the source systems based on an importance of each data attribute with respect to business or other processes and the target system. For example, data attributes that are mandatory for business or other processes in the target system are considered to be business critical. Accordingly, data attributes of the source systems that are defined as highly critical for business or other operations on the target system are provided with a strong business critical weight (e.g., 100% weight), while remaining data attributes are provided with a weak business critical weight (e.g., 0% weight) with respect to this criterion.

By way of further example, data attributes that are mandatory or required by the target system (including business critical data attributes) are considered to be target based. Accordingly, data attributes of the source systems that are required by, or require a specific format in, the target system are provided with a strong target based weight (e.g., 100% weight), while data attributes of the source systems that are pass-through (e.g., the target system accepts any values) are given a weak target based weight (e.g., 0% weight).

The weights are utilized to generate a weighted data quality score that provides a view of source data that needs to be cleansed prior to migrating the source data to the target system and a prioritization direction for the data cleansing effort as described below. However, any desired weight values may be assigned to the data attributes of the source systems to reflect importance of the data attributes to the target system and business or other processes of the target system. Further, the designation of data attributes as business critical and/or target based may be determined by user analysis of the target system and/or various computerized tools (e.g., to determine the mandatory or required attributes or fields of the target system).

Record logs may be generated based on application of the sets of data quality rules for the target system to the source data attributes. A record log may indicate, by way of example, each data record analyzed, compliance and non-compliance of data attributes of those data records with specific data quality dimensions, and associated weights for the data attributes within those data records (e.g., business critical, required by the target system, etc.). In addition, data quality profiler module 128 may maintain various record counts or quantities of data records during and/or after the application of the sets of data quality rules. The record counts or quantities may be employed to determine data quality percentage scores (e.g., dimension percentage values, attribute percentage values, domain percentage values, etc.) as described below. For example, the record counts or quantities may include total records (e.g., of a domain, of a domain with business critical data attributes, of a domain with data attributes required by the target system, etc.), and quantities of records with a specific data attribute that is compliant/non-compliant with a particular data quality dimension (e.g., for records of a domain, for records of a domain with business critical data attributes, for records of a domain with data attributes required by the target system, etc.).

The record counts and record log are preferably determined with respect to a data domain of a source system, but may be determined for any desired scope (e.g., all or any portion of the domains, all or any portion of the source systems, all or any portion of records (e.g., records with business critical data attributes, records with data attributes required by the target system, etc.), etc.).

The results of the application of the data quality rules for the target system to the source data attributes and the associated information (e.g., action plans, record logs, counts, etc.) are persisted for data quality engine 130. The data quality rules of the target system are utilized to identify data of the source systems that are actionable or problematic with respect to the target system prior to migration to ensure the source data is accepted into the target system.

Data quality engine 130 (e.g., via one or more server systems 110) computes scores for the data attributes for each of the data domains of a source system 140. A dimension percentage value is computed for a data attribute for each data quality dimension to indicate data quality with respect to that data quality dimension. The data quality engine aggregates dimension percentage values for a data attribute to determine an attribute percentage value indicating data quality of the data attribute across the data quality dimensions. The attribute percentage values of data attributes are aggregated to determine a domain percentage value indicating data quality for the data domain containing those data attributes.

In particular, a dimension percentage value for a data quality dimension of a data attribute is determined by obtaining a quantity of data records (e.g., from the set of tables in the data domain) that contain a value for the data attribute satisfying the data quality rules for the target system for that data quality dimension. This quantity may be determined by analyzing the record log and/or from the various record counts described above.

The quantity of data records satisfying the data quality dimension is divided by the total quantity of data records in the data domain containing the data attribute (e.g., from the set of tables in the data domain) to produce the dimension percentage value of the data quality dimension for the data attribute. This total quantity may be determined by analyzing the record log and/or from the various record counts described above. The dimension percentage value is typically normalized to an integer value between zero and one-hundred percent (e.g., rounding, truncation, etc.), but may be any value within any desired value range. For example, the dimension percentage value (DIMPV) for a data attribute may be expressed as the integer value of:

$$DIMPV = \frac{\text{Number of records of the data attribute satisfying a data quality dimension}}{\text{Total number of records with the data attribute}} * 100$$

A dimension percentage value is determined for each data quality dimension of a data attribute in substantially the same manner described above.

An attribute percentage value is achieved for a data attribute of a data domain by determining the quantity of data records in common among (or within the intersection of) the data records identified as satisfying each of the individual data quality dimensions. In other words, the attribute percentage value may be determined by obtaining a quantity of clean data records in the data domain (e.g., from the set of tables in the data domain) containing the data attribute with a value satisfying each of the data quality dimensions for that data attribute. This quantity may be determined by analyzing the record log and/or from the various record counts described above.

The quantity of clean data records is divided by the total quantity of data records in the data domain (e.g., from the set of tables in the data domain) containing the data attribute to produce the attribute percentage value. This total quantity may be determined by analyzing the record log and/or from the various record counts described above. The attribute percentage value is typically normalized to an integer value between zero and one-hundred percent (e.g., rounding) truncation, etc.), but may be any value within any desired value range. For example, the attribute percentage value (ATPV) for a data attribute may be expressed as the integer value of:

$$ATPV = \frac{\text{Number of records of the data attribute satisfying each data quality dimension}}{\text{Total number of records with the data attribute}} * 100$$

The data quality engine computes the scores (e.g., dimension and attribute percentage values) for each data attribute of a data domain of a source system 140 (without applying the weightings for business critical attributes and attributes required by the target system), and forms an unweighted matrix 500 as illustrated in FIG. 5. The unweighted matrix is preferably in the form of a table with a row for each data attribute of the data domain (e.g., Data Attributes A-F of Data Domain I as viewed in FIG. 5) and a column for each data quality dimension. By way of example, the data quality dimensions include validity (e.g., corresponding to the validity metric of admissibility dimension 405 of FIG. 4), consistency (e.g., corresponding to the consistency metric of admissibility dimension 405 of FIG. 4), completeness (e.g., corresponding to the completeness metric of admissibility dimension 405 of FIG. 4), obsolescence (e.g., a record marked for deletion, etc.), precision (e.g.) corresponding to metrics of confidence dimension 410 of FIG. 4), and accuracy (e.g., corresponding to metrics of fit for purpose dimension 415 of FIG. 4). However, any quantity of any desired data quality dimensions or metrics may be utilized. The columns typically contain the dimension percentage value with respect to the corresponding data quality dimension for each data attribute. In addition, the table includes a column for the attribute percentage values (e.g., "Total Clean" as viewed in FIG. 5) for the data attributes that combines the dimension percentage values of the data quality dimensions for each row (or data attribute) as described above.

Unweighted matrix 500 provides a view of data quality of the source data from the perspective of target system 150. In other words, the dimension and attribute percentage values indicate the level of data quality or compliance of the source data with respect to data requirements of target system 150.

Figure 6:
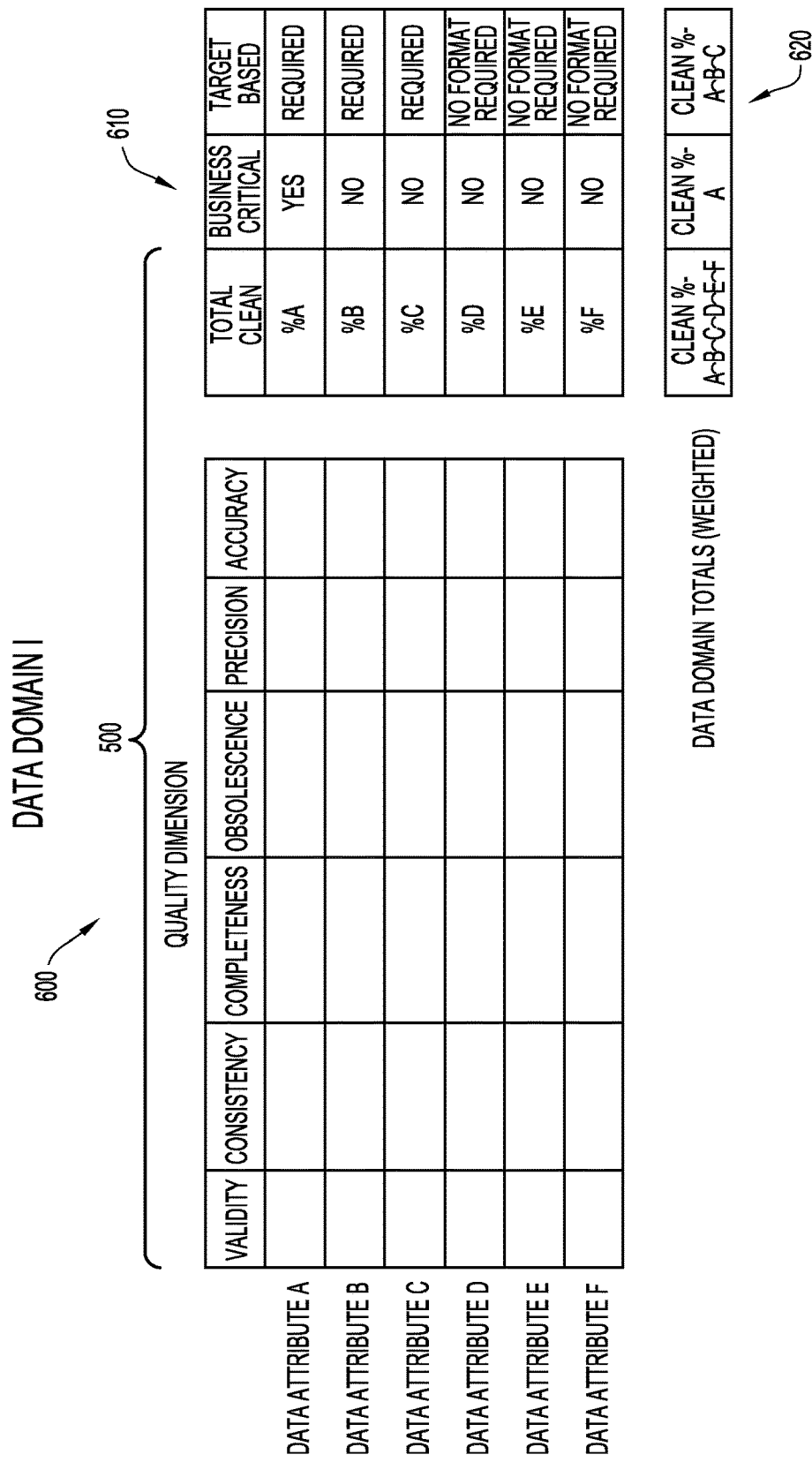
FIG. 6 is an illustration of an example matrix providing overall scores for data quality metrics of data domain attributes of a source system according to an embodiment of the present invention.

Weighted data quality scores are further produced based on a percentage of data attributes designated as business or process critical and/or required by the target system. In particular, an intersection of data records (or quantity of common data records) across the data attributes designated as business critical or required by the target system provides a weighted data quality score for a data domain. The data quality engine (e.g., via one or more server systems 110) computes weighted data quality percentage values for the data domain (e.g., for business critical data attributes and data attributes required by the target system), and forms a weighted matrix 600 as illustrated in FIG. 6. The weighted matrix is preferably in the form of a table, and includes unweighted matrix 500 with a row for each data attribute of the data domain (e.g., Data Attributes A-F of Data Domain I as viewed in FIG. 6) and a column for each data quality dimension (e.g., validity, consistency, completeness, obsolescence, precision, and accuracy) as described above. The columns of unweighted matrix 500 typically contain the dimension percentage value with respect to the corresponding data quality dimension for each data attribute as described above. The columns of unweighted matrix 500 further include the attribute percentage value (e.g., "Total Clean" as viewed in FIG. 6) for each row (or data attribute) as described above. However, any quantity of any desired data quality dimensions or metrics may be utilized.

In addition, weighted matrix 600 includes a weight section 610 and a totals section 620. Weight section 610 includes additional columns for each data attribute of unweighted matrix 500. By way of example, the additional columns include a column indicating the business critical weight for a data attribute with respect to the importance of that data attribute to business or other processes of the target system (e.g., "Business Critical" as viewed in FIG. 6), and a column indicating the target based weight for a data attribute with respect to the importance of that data attribute to the target system (e.g., "Target Based" as viewed in FIG. 6). By way of example, the business critical column indicates weights of either 100% (e.g., "Yes" as viewed in FIG. 6) or 0% (e.g., "No" as viewed in FIG. 6), while the target based column similarly indicates weights of either 100% (e.g., "Required" as viewed in FIG. 6) or 0% (e.g., "No Format Required" as viewed in FIG. 6). However, the additional columns may utilize any desired indicators to indicate any weight values.

Totals section 620 includes fields providing various percentage values for the data domain for the attribute percentage value (e.g., "Total Clean") column and each of the additional columns of weight section 610. In particular, a domain percentage value of totals section 620 for the attribute percentage value (e.g., "Total Clean") column represents an unweighted percentage within the data domain of completely clean data (versus data with some data quality issues). This may be determined by obtaining the quantity of data records in common among (or within the intersection of) the clean data records of each of the individual data attributes (e.g., a data record that satisfies each of the data quality dimensions for the individual data attribute of interest in that data record).

In other words, this quantity of clean data records is determined by obtaining a quantity of clean data records (e.g., a data record that satisfies each of the data quality dimensions for each of the data attributes of interest in that data record) in the data domain (e.g., from the set of tables in the data domain). The quantity of clean data records in the data domain is divided by the total quantity of data records in the data domain (e.g., from the set of tables in the data domain) containing the data attributes of interest to produce the domain percentage value. These quantities may be determined by analyzing the log record and/or from the various record counts described above. The domain percentage value is typically normalized to an integer value between zero and one-hundred percent (e.g., rounding, truncation, etc.), but may be any value within any desired value range. For example, the domain percentage value (DOMPV) for a data domain may be expressed as an integer value of:

$$DOMPV = \frac{\text{Number of clean records in the domain}}{\text{Total number of records in the domain}} * 100$$

The business critical and target based percentage values of totals section 620 for the business critical and target based columns represent weighted total data quality percentage values (e.g., data quality percentage values with the corresponding weights applied to the data attributes). In particular, the business critical percentage value of totals section 620 for the business critical column is calculated by obtaining (e.g., from the set of tables in the data domain) a quantity of clean data records (e.g., a data record satisfying each of the data quality dimensions for each of the data attributes of interest of that data record) including an attribute designated as business critical (e.g., having a weight of "Yes" or 100% as indicated in FIG. 6). This may be determined by obtaining the quantity of data records in common among (or within the intersection of the clean data records of each of the individual data attributes designated as business critical (e.g., a data record that satisfies each of the data quality dimensions for the individual data attribute of interest in that data record). By way of example with respect to FIG. 6, the quantity of common data records is determined from the clean data records containing Data Attribute A since this is the only data attribute in the example weighted matrix designated as business critical. This quantity (of clean data records) is divided by the total quantity of data records in the data domain containing a data attribute designated as business critical. These quantities may be determined by analyzing the log record and/or from the various record counts described above. The business critical percentage value is typically normalized to an integer value between zero and one-hundred percent (e.g., rounding, truncation, etc.), but may be any value within any desired value range. For example, the business critical percentage value (BCPV) for a data domain may be expressed as an integer value of:

$$BCPV = \frac{\text{Number of clean records in the domain with a business critical data attribute}}{\text{Total number of records in the domain with a business critical data attribute}} * 100$$

The target based percentage value of totals section 620 for the target based column is calculated by obtaining (e.g., from the set of tables in the data domain) a quantity of clean data records (e.g., a data record satisfying each of the data quality dimensions for each of the data attributes of interest of that data record) including an attribute designated as target based (or required by the target system) (e.g., having a weight of "Required" or 100% as indicated in FIG. 6). This may be determined by obtaining the quantity of data records in common among (or within the intersection of) clean data records of each of the individual data attributes designated as target based (e.g., a data record that satisfies each of the data quality dimensions for the individual data attribute of interest in that data record). By way of example with respect to FIG. 6, the quantity of common data records is determined from the clean data records containing Data Attributes A, B, and C since these are the only data attributes in the example weighted matrix designated as target based. This quantity (of clean data records) is divided by the total quantity of data records in the data domain containing the data attributes designated as target based. These quantities may be determined by analyzing the log record and/or from the various record counts described above. The target based percentage value is typically normalized to an integer value between zero and one-hundred percent (e.g., rounding, truncation, etc.), but may be any value within any desired value range.

For example, the target based percentage value (TBPV) for a data attribute may be expressed as an integer value of:

$$TBPV = \frac{\text{Number of clean records in the domain with a target based data attribute}}{\text{Total number of records in the domain with a target based data attribute}} * 100$$

Once the data quality percentage values (e.g., dimension percentage values, attribute percentage values, domain percentage values, business critical percentage values, target based percentage values, etc.) have been determined for the data domains of source systems 140 (e.g., weighted matrix 600 has been determined for each data domain of each source system 140), data quality engine 130 (e.g., via one or more server systems 110) aggregates values for a data domain from each of source systems 140 to produce aggregated percentage values for the data domain across the source systems. The aggregated percentage value determinations may be applied to any portion of a data domain. For example, aggregated percentage values for the entire data domain, a data object or other portion of the data domain (e.g., target process as described below, etc.) may be determined as described below by utilizing the data attributes of the data domain or desired portion as the attributes of interest.

Figure 7A:
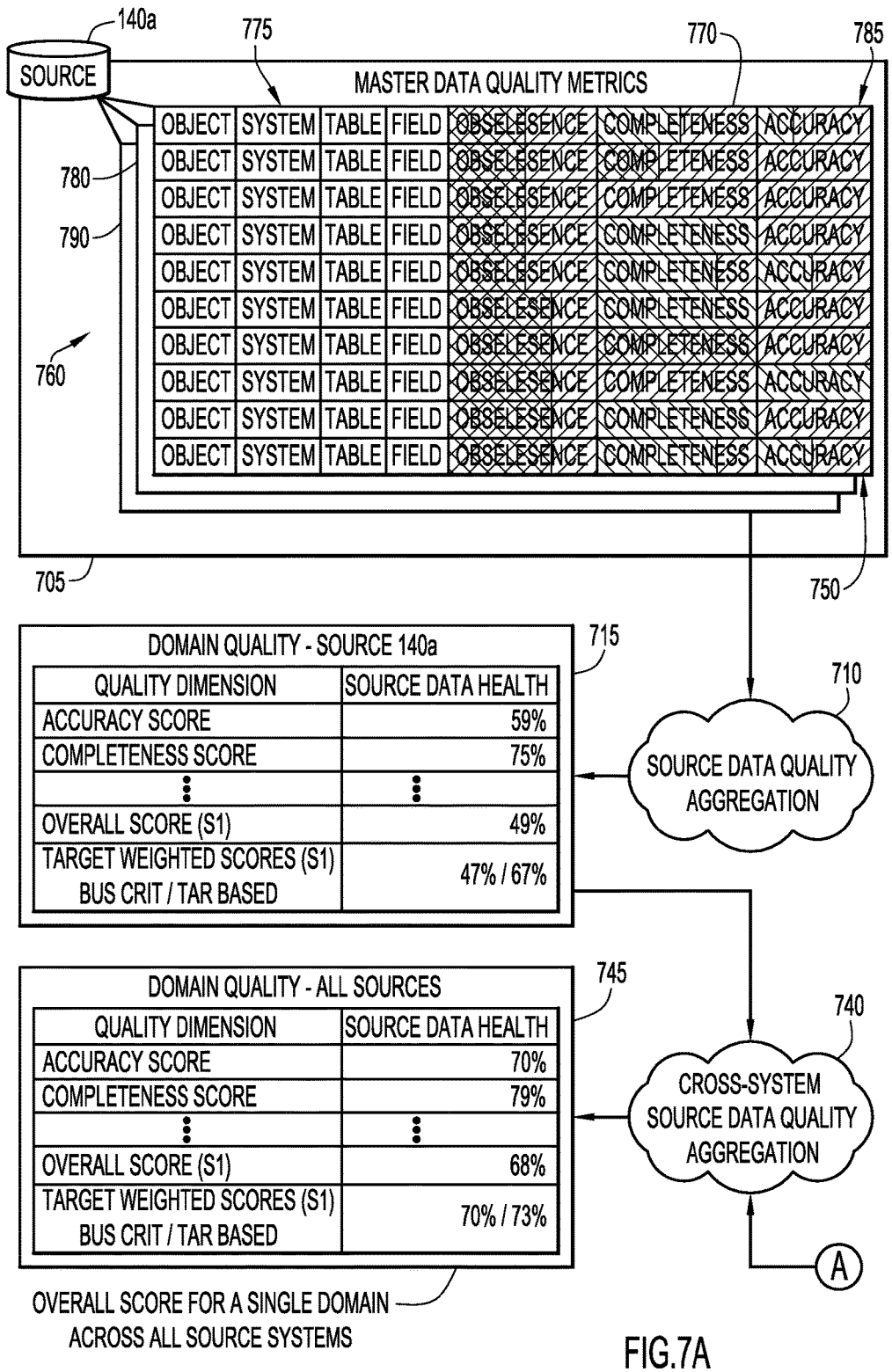
FIGS. 7A-7B are a flow diagram of aggregating data quality metrics for data domain attributes across plural source systems according to an embodiment of the present invention.
Figure 7B:
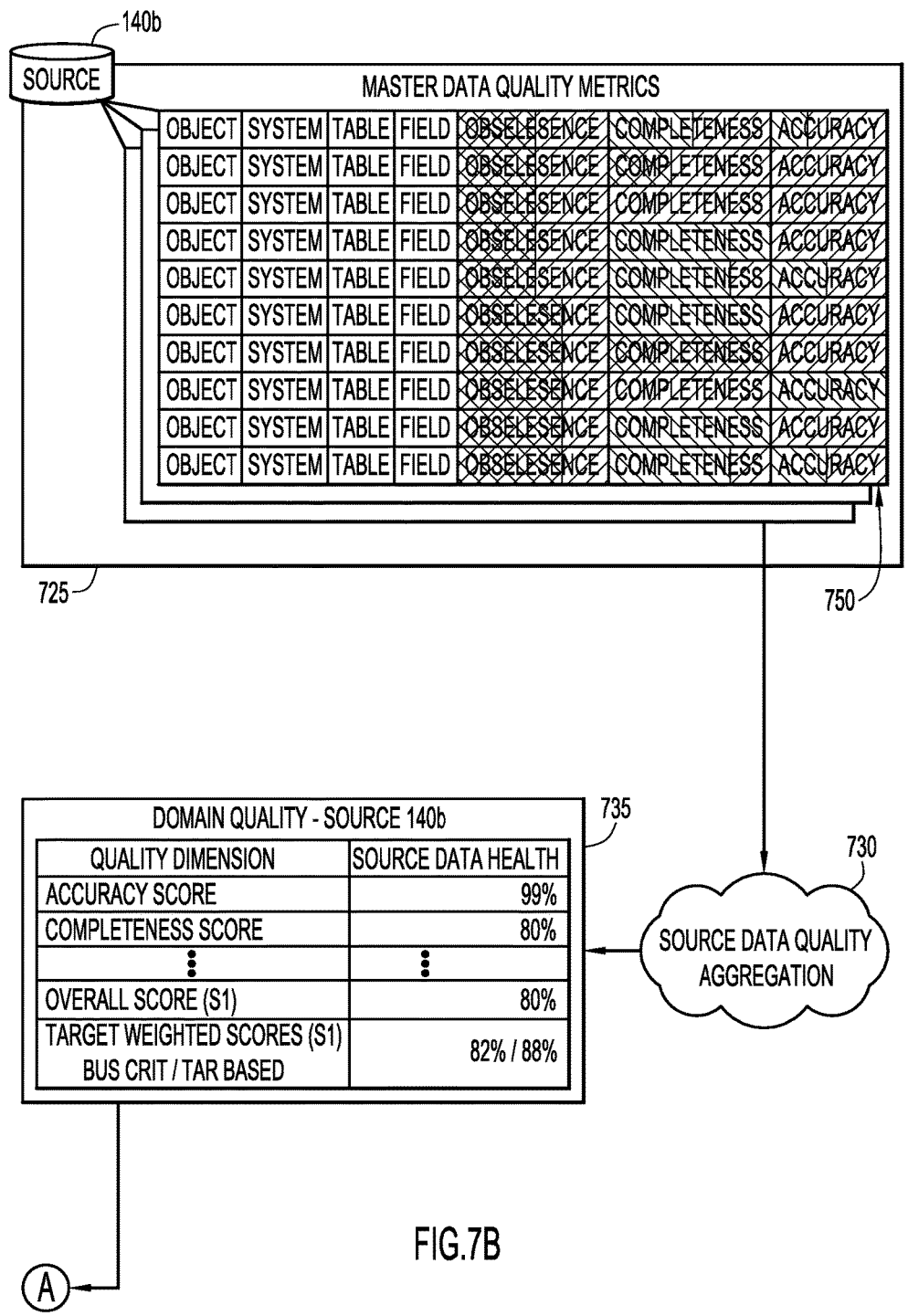

By way of example with respect to FIGS. 7A-7B, a data domain 750 resides on source systems 140a, 140b at respective flows 705, 725. The data domain includes a plurality of data attributes of interest (e.g., for the entire domain, a data object, a target process, etc.), where the dimension percentage values for data quality dimensions of the individual data attributes of interest are determined for the data domain within each source system 140a, 140b as described above (e.g., weighted matrix 600 of FIG. 6).

The dimension percentage values for the individual data attributes of interest within data domain 750 are combined at respective flows 710, 730 to produce aggregate dimension percentage values at respective flows 715, 730. For example, an aggregate dimension percentage value for an accuracy data quality dimension of data attributes of interest of data domain 750 on source system 140a may be determined by combining the dimension percentage values for the accuracy data quality dimension for the data attributes of interest of the data domain. In other words, the aggregate dimension percentage value with respect to source system 140a is determined by combining the quantities of data domain records containing data attributes of interest on source system 140a with values satisfying the accuracy data quality dimension, and dividing this combined quantity by a total quantity of data records on source system 140a containing data attributes of interest of data domain 750. The aggregate dimension percentage value is typically normalized to an integer value between zero and one-hundred percent (e.g., rounding, truncation, etc.), but may be any value within any desired value range. For example, the aggregate dimension percentage value (ADIMPV) for a data quality dimension may be expressed as an integer value of:

$$ADIMPV = \frac{\text{Number of records of the data domain on a source system with attributes of interest satisfying a data quality dimension}}{\text{Total number of records of the data domain on a source system with attributes of interest}} * 100$$

The aggregate dimension percentage values for remaining data quality dimensions of the data attributes of interest on source systems 140*a*, 140*b* may be determined in substantially the same manner. The various quantities of data records may be determined by analyzing the log records of source systems 140*a*, 140*b* and/or from the various record counts of the source systems described above.

The domain percentage value (e.g., indicated as "Overall Score" in FIGS. 7A-7B) and business critical and target based percentage values (e.g., indicated as "Target Weighted Scores" in FIGS. 7A-7B) are further determined at respective flows 715, 735 as described above (e.g., total section 620 of weighted matrix 600 of FIG. 6). For example, the domain percentage value for source system 140*a* may be determined by obtaining a quantity of clean data domain records (e.g., a data record that satisfies each of the data quality dimensions for each of the data attributes of interest in that data record) on source system 140*a*. This quantity (of clean data records) is divided by the total quantity of domain data records on source system 140*a* containing the data attributes of interest, and is preferably normalized to an integer value within a value range between zero and one-hundred percent as described above.

By way of further example, the business critical percentage value (e.g., "Target Weighted Scores") for source system 140*a* may be determined by obtaining a quantity of clean data domain records (e.g., a data record that satisfies each of the data quality dimensions for each of the data attributes of interest in that data record) including a business critical data attribute on source system 140*a*. This quantity (of clean data records) is divided by the total quantity of data records in the data domain with data attributes of interest including a business critical data attribute, and preferably normalized to an integer value within a value range between zero and one-hundred percent as described above.

Similarly, the target based percentage value for source system 140*a* may be determined by obtaining a quantity of clean data domain records (e.g., a data record that satisfies each of the data quality dimensions for each of the data attributes of interest in that data record) including a target based data attribute. This quantity (of clean data records) is divided by the total quantity of data records in the data domain with data attributes of interest including a target based data attribute, and preferably normalized to an integer value within a value range between zero and one-hundred percent as described above.

The domain, business critical, and target based percentage values for the data attributes of interest of the data domain on source system 140*b* may be determined in substantially the same manners described above. The various quantities of data records may be determined by analyzing the log records of source systems 140*a*, 140*b* and/or from the various record counts of the source systems described above.

The data quality percentage values for data domain 750 from source systems 140*a*, 140*b* may be combined at flow 740 to produce overall dimension percentage values for data domain 750 across each of the source systems at flow 745. For example, an overall dimension percentage value for an accuracy data quality dimension of data domain 750 across source systems 140*a*, 140*b* may be determined by combining the quantities of data domain records satisfying the accuracy data quality dimension for data attributes of interest of the data domain on source systems 140*a*, 140*b*. These individual quantities have been previously determined by the source systems for computation of the aggregate dimension percentage values described above and may be combined or summed to produce the combined quantity.

The combined quantity is divided by a total quantity of data records containing the data attributes of interest of the data domain on source systems 140*a*, 140*b* to produce the overall dimension percentage value for the accuracy data quality dimension with respect to source systems 140*a*, 140*b*. This total quantity may be determined by combining or summing individual total quantities previously determined by the source systems for computation of the aggregate dimension percentage values described above. The overall dimension percentage value is typically normalized to an integer value between zero and one-hundred percent (e.g., rounding, truncation, etc.), but may be any value within any desired value range. For example, the overall dimension percentage value (ODIMPV) for a data quality dimension across source systems 140*a*, 140*b* may be expressed as an integer value of $$ODIMPV = \frac{\text{Number of records of the data domain on the source systems with attributes of interest satisfying a data quality dimension}}{\text{Total number of records within the data domain on the source systems with attributes of interest}} * 100$$

The overall dimension percentage values for remaining data quality dimensions of the data domain attributes of interest on source systems 140*a*, 140*b* may be determined in substantially the same manner described above. The various quantities of data records may be determined by analyzing the log records of source systems 140*a*, 140*b*, from the record counts, and/or from the previously determined quantities of the source systems described above.

The overall domain percentage (e.g., "Overall Score") value for data domain 750 may be determined at flow 745 by combining the domain percentage values for source systems 140*a*, 140*b*. For example, the overall domain percentage value may be determined by obtaining a quantity of clean data domain records (e.g., a data record that satisfies each of the data quality dimensions for each of the data attributes of interest in that data record) of source systems 140*a*, 140*b*. These individual quantities have been previously determined by the source systems for computation of the domain percentage values described above, and may be combined or summed to produce the combined quantity. This combined quantity is divided by a total quantity of data records containing the data attributes of interest of the data domain on source systems 140*a*, 140*b*). This total quantity may be determined by combining or summing individual total quantities previously determined by the source systems for computation of the domain percentage values described above. The overall domain percentage value is typically normalized to an integer value between zero and one-hundred percent (e.g., rounding, truncation, etc.), but may be any value within any desired value range. For example, the overall domain percentage value (ODOMPV) for a data domain across source systems 140*a*, 140*b* may be expressed as an integer value of $$ODOMPV = \frac{\text{Number of clean records in the domain on the source systems with attributes of interest}}{\text{Total number of records in the domain on the source systems with attributes of interest}} * 100$$

The overall business critical percentage value and overall target based percentage value (e.g., "Total Weighted Scores") for data domain 750 may be further determined at flow 745 by combining the business critical percentage values and target based percentage values for source systems 140a, 140b. By way of example, the overall business critical percentage value for source systems 140a, 140b may be determined by obtaining a quantity of clean data domain records (e.g., a data record that satisfies each of the data quality dimensions for each of the data attributes of interest in that data record) including a data attribute designated as business critical on source systems 140a, 140b. These individual quantities have been previously determined by the source systems for computation of the business critical percentage values described above, and may be combined or summed to produce the combined quantity. The combined quantity is divided by the total quantity of data records in the data domain on source systems 140a, 140b with data attributes of interest including a business critical data attribute. This total quantity may be determined by combining or summing individual total quantities previously determined by the source systems for computation of the business critical percentage values described above. The overall business critical percentage value is typically normalized to an integer value between zero and one hundred percent (e.g., rounding, truncation, etc.), but may be any value within any desired value range. For example, the overall business critical percentage value (OBCPV) for a data domain may be expressed as an integer value of $$OBCPV = \frac{\text{Total number of clean records in the domain on the source systems with attributes of interest including a business critical data attribute}}{\text{Total number of records in the domain on the source systems with attributes of interest including a business critical data attribute}} * 100$$

Similarly, the overall target based percentage value for source systems 140a, 140b may be determined by obtaining a quantity of clean data domain records (e.g., a data record that satisfies each of the data quality dimensions for each of the data attributes of interest in that data record) of source systems 140a, 140b including an attribute designated as target based on source systems 140a, 140b. These individual quantities have been previously determined by the source systems for computation of the target based percentage values described above, and may be combined or summed to produce the combined quantity. The combined quantity is divided by the total quantity of data records of source systems 140a, 140b with data attributes of interest including a target based attribute. This total quantity may be determined by combining or summing individual total quantities previously determined by the source systems for computation of the target based percentage values described above. The overall target based percentage value is typically normalized to an integer value between zero and one-hundred percent, but may be any value within any desired value range. For example, the overall target based percentage value (OTBPV) for a data domain across source systems 140a, 140b may be expressed as an integer value of:

$$OTBPV = \frac{\text{Total number of clean records in the domain on the source systems with attributes of interest including a target based data attribute}}{\text{Total number of records in the domain on the source systems with attributes of interest including a target based data attribute}} * 100$$

The various quantities of data records for the overall domain, business critical, and target based percentage values may be determined by analyzing the to records of source systems 140a, 140b, from the record counts, and/or from the previously determined quantities of the source systems described above.

The above percentage value determinations (e.g., aggregate dimension, domain, business critical, target based, overall domain, overall business critical, and overall target based percentage values, etc.) may be applied for any quantity of source systems containing records or objects for a common data domain. Further, the above percentage value determinations may be applied to any portion of a data domain as described above. For example, percentage values for a data object or other portion of the data domain may be performed in substantially the same manners described above. In this case, the set of records for the percentage value determinations include data records containing the data attributes of the data object (or domain portion) of interest. By way of example, when a data object or portion of interest (e.g., a target process as described below) includes data attributes A, B, and C, the percentage value determinations are based on the set of data records in the data domain including the data attributes of interest A, B, and C (as opposed to all data records and attributes of the domain). Further, percentage values for an entire data domain may be determined, where all data attributes of the domain are considered to be the data attributes of interest.

In addition, the various percentage values for a domain of a source system and for a domain across plural source systems may be provided in a table or chart as illustrated, by way of example, at flows 715, 735, and 745 of FIGS. 7A-7B. The table or chart may be presented or placed in a report for determining cleansing activities. For example, flow 715 illustrates a table or chart for a data domain of source system 140a indicating an aggregate dimension percentage value of 59% for the accuracy data quality dimension, an aggregate dimension percentage value of 75% for the completeness data quality dimension, a domain percentage value (e. "Overall Score") of 49%, a business critical percentage value of 47%, and a target based percentage value of 67%.

By way of further example, flow 735 illustrates a table or chart for the same data domain on source system 140b indicating an aggregate dimension percentage value of 99% for the accuracy data quality dimension, an aggregate dimension percentage value of 80% for the completeness data quality dimension, a domain percentage value (e.g., "Overall Score") of 80%, a business critical percentage value of 82%, and a target based percentage value of 88%.

In addition, flow 745 illustrates a table or chart for the data domain across source systems 140a, 140b. By way of example, the table or chart indicates an overall dimension percentage value of 70% for the accuracy data quality dimension, an overall dimension percentage value of 79% for the completeness data quality dimension, an overall domain percentage value (e.g., "Overall Score") of 68%, an overall business critical percentage value of 70%, and an overall target based percentage value of 73%. Thus, the various data quality percentage values may be compared to thresholds to determine whether data cleansing should be performed, where source system 140*b* in this example includes cleaner data, and cleansing efforts may be prioritized to source system 140*a*.

Referring back to FIG. 3, data quality reports module 132 (e.g., via one or more server systems 110) produces reports and establishes a baseline at step 310. The data quality reports module visualizes the data quality percentage values by data domain and provides further information (e.g., drill-down) for data attributes of interest based on user selection. An action plan providing recommended data cleansing activities is generated (e.g., based on the log records and statuses), and the data cleansing activities are performed at step 315. The action plan may indicate which data records are to be cleansed at the source system, data to be created at the source system prior to conversion, and conversion rules needed to transform source data to standards of the target system. For example, the action plan may be in the form of a listing of records indicating for each record the statuses of the data record attributes, the data quality rules (for the target system) violated, reasons for the violation, and recommended cleansing actions. The cleansing actions may be performed on data within the source systems and/or staging areas 122 manually and/or by the data quality engine as described below.

The source analysis phase of the data quality analysis enables identification of the manner and location within the migration process for data cleansing. The action plan may be generated by data quality engine 130 (e.g., via one or more server systems 110) based on a rule set. For example, the various data quality percentage values and/or statuses of the data records may be applied to one or more rules to determine a recommended data cleansing activity (e.g., transformation, etc.) for the action plan. Further, a user may analyze the visualized data quality percentage values and determine an action plan and/or the cleansing activities therein. By way of example, data quality issues that are fairly standard and high in volume may be candidates for conversion logic cleansing, while data quality issues requiring manual inspection may be corrected in the source system.

Further, data quality engine 130 (e.g., via one or more server systems 110) may perform the data cleansing activities indicated in the action plan. For example, the data quality engine may determine appropriate conversions or transformations and transform the corresponding data. Further, the data quality engine may analyze the action plan and correct and/or add data based on the statuses and/or data quality rules violated by the data and indicated in the action plan.

Once the data cleansing activities have been performed, the data quality percentage values are re-calculated for the cleansed data at step 320, and the reports, charts, and action plan are updated based on the revised data quality percentage values. The generation of action plans and cleansing of data at step 315 and re-calculation at step 320 are repeated until the results of the data quality analysis are satisfactory (e.g., the source data is sufficiently clean for migration to the target system, etc.). For example, the data quality percentage values may satisfy corresponding thresholds or other criteria to indicate sufficient cleanliness of the source data.

Figure 8:
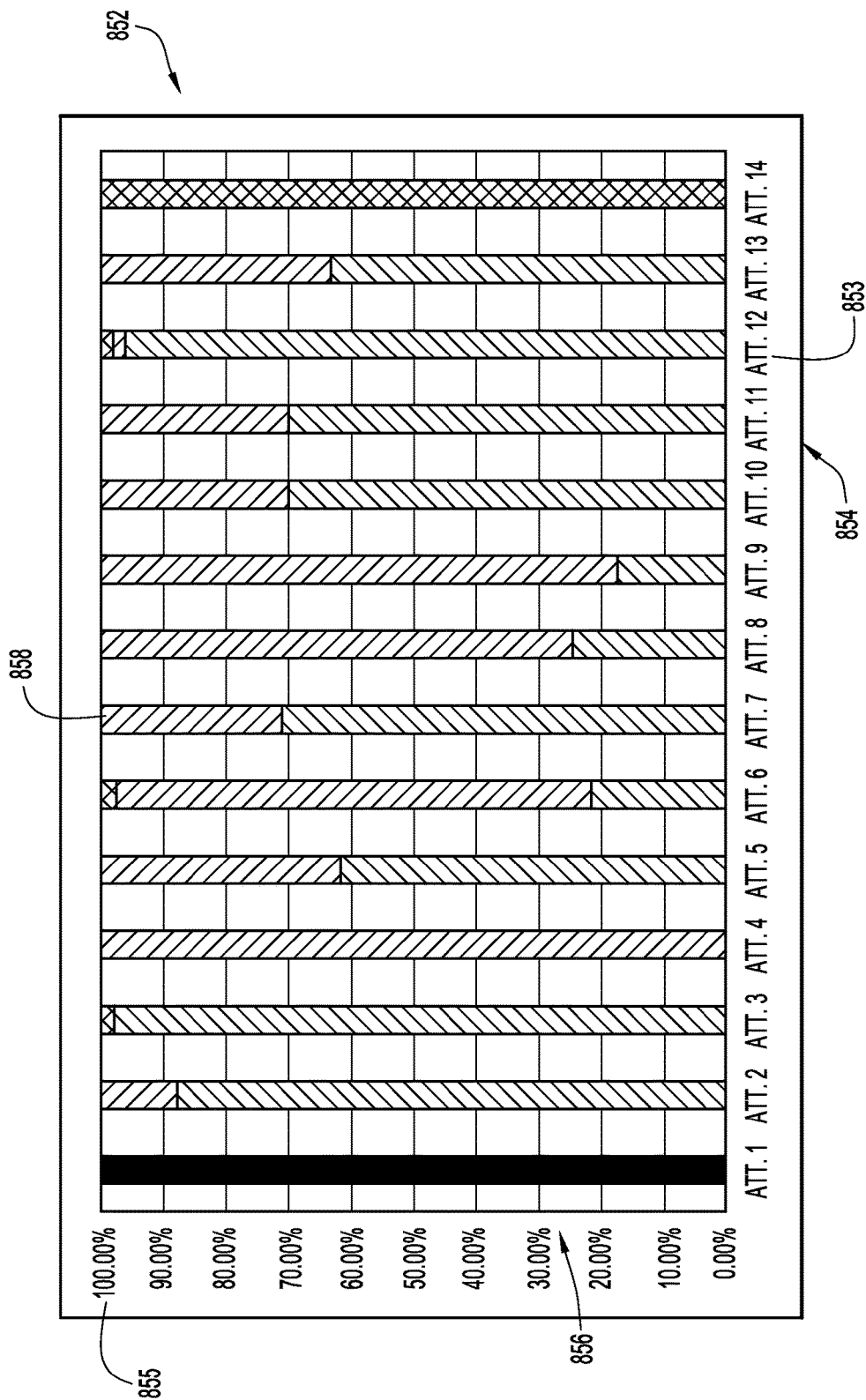
FIG. 8 is a graphical schematic illustration of an example interface screen providing data quality analysis results for a data domain according to an embodiment of the present invention.

An example interface screen (e.g., presented by data quality reports module 132 and one or more server systems 110) visualizing results of the data quality analysis is illustrated in FIG. 8. In particular, interface screen 800 includes a bar type graph or chart 852 indicating various percentage values for the data attributes of a data domain on one or more source systems. Bar chart 852 includes each data attribute 853 of the data domain along a horizontal or bottom axis 854, and numeric percentage values 855 along a vertical or side axis 856 (e.g., from 0% to 100%). Each data attribute 853 is associated with a color-coded bar 858 that represents the data records of that data attribute. The boundaries of the color-coded sections along vertical axis 856 indicate the percentage of data records associated with that color coded section. For example, a green section of color-coded bar 858 may indicate a percentage of data records within the data domain that are clean or fit for purpose, a red section of color-coded bar 858 may indicate a percentage of data records within the data domain that are actionable or problematic, a blue section of color-coded bar 858 may indicate a percentage of data records within the data domain that are handled in a conversion rule, and a yellow section of color-coded bar 858 may indicate a percentage of records within the data domain that are unknown (e.g., not mapped to the target system, etc.). However, any suitable colors or other coding schemes may be utilized in any fashion.

Thus, with respect to the above example, a green section of a color-coded bar 858 with boundaries at 20% and 30% along vertical axis 856 indicates that 10% of the data records of the data domain (30%–20%=10%) for the corresponding data attribute are clean or fit for purpose. As the source data of the data domain is cleansed, the red sections of color-coded bars 858 (e.g., indicating actionable or problematic data) gradually change to green (e.g., indicating clean data) or blue sections (e.g., handled by a conversion rule) to indicate data is ready for migration. Further, chart 852 may be placed in a report for routing to appropriate users and/or administrators.

Interface screen 800 preferably provides a visual representation of the data quality of the data attributes within a data domain (e.g., Customer Master, Material Master, etc.). A data attribute 853 may be selected from interface screen 800 (e.g., via a mouse or other input device), where the actionable or problematic data records of the selected data attribute are presented. For example, data records containing a selected data attribute that violate data quality rules across in-scope (or relevant) data quality dimensions (e.g., accuracy, completeness, etc.) may be presented. This presentation may be used to generate action plans, where actionable or problematic data may be routed to users and/or administrators for correction or designation to other users/administrators for appropriate handling.

Data quality reports module 132 (e.g., via one or more server systems 110) may provide various other visualizations of the data quality analysis for presentation on interface screens and/or inclusion within reports. For example, an interface screen and/or report may include visualizations in the form of unweighted matrix 500 (FIG. 5), weighted matrix 600 (FIG. 6), and the tables or charts of flows 715, 735, and 745 (FIGS. 7A-7B).

The visualization may be in the form illustrated at flows 705, 725 (FIGS. 7A, 7B). In this case, the visualization is in the form of a chart 760 that includes, by way of example, data dimensions 770, 780, 790 each containing a plurality of data attributes. The data dimensions are arranged as overlying tables each including rows for data attributes of that data dimension. The rows include fields 775 with information identifying the data attribute (e.g., object, system, table, field, etc.), and color-coded fields 785 each for a corresponding data quality dimension (e.g., obsolescence, completeness, accuracy, etc.). Fields 785 indicate percentage values for clean/problematic data (e.g., an amount a field is shaded and/or the particular color (e.g., red, green, blue, etc.) may indicate the percentage value of clean or problematic data, etc.) for the corresponding data attribute. This visualization may further be employed to provide overall percentage values for the data quality dimensions across plural source systems and serve to present information from a generated action plan.

The interface screens for the above visualizations may be navigated among in any desired fashion, where selection of a data domain or data attribute from a visualization on one interface screen may present other interface screens with visualizations of further detailed information about the selected data domain or data attribute. For example, a data domain selected from chart 760 may enable presentation of weighted matrix 600 (FIG. 6) for the selected data domain. Further, selection of a data attribute from weighted matrix 600 may enable presentation of problematic data records of the selected data attribute.

The source analysis phase of the data quality analysis is typically an iterative process that occurs during the design and early build cycles of a project. During this time, the cleansing designations or statuses for each data record may change. For example, data records initially designated with a status "Dirty, Action needed in source" may change to a status of "Fit for use, Conversion needed" once a suitable conversion rule is discovered. A data record with a status of "Unknown" may change to a different status as the mapping is matured. This source analysis phase is typically the only phase in which the statuses apply since alignment area 124 is based on the target data model, and data cannot be moved from staging areas 122 to the alignment area 124 without the (LS2T) mapping linking a source data attribute to a target data attribute.

Once the source analysis phase of the data analysis is completed, the source data is initially cleansed to a sufficient level, and a target process phase of the data quality analysis may be performed. During the target process phase, data in staging areas 122 is converted to the common data model of alignment area 124 (e.g., via an ETL tool) and profiled by the business process hierarchy (BPH). Data quality engine 130 (e.g., via one or more server systems 110) determines actionable or problematic data prioritized for critical processes of the target system. Reports are routed to appropriate users and/or administrators by data quality reports module 132 (e.g., via one or more server systems 110).

In particular, the target process phase of data quality analysis includes associating data domains with the corresponding business or other processes within the business process hierarchy (BPH). This may be achieved by a separate linking module (of the analysis modules 120) employed on a tool. Thus, the target process phase links the data domains containing data quality percentage values to their corresponding business or other processes on the target system.

The target process phase of the data quality analysis further determines whether the cleansing activities of the action plan (e.g., either in the source system or alignment area 124) have been performed correctly, and identifies the potential impact of actionable or problematic data relative to the business or other processes that the actionable data supports. In other words, the target process phase provides an indication of the cleanliness of source data for the particular business or other processes of the target system utilizing that source data. During the target process phase, the statuses of the data records of the data attributes are updated as cleansing activities continue. This assists with prioritizing data cleansing efforts during the data migration and identifying problem areas by process domain for each source system.

Figure 9:
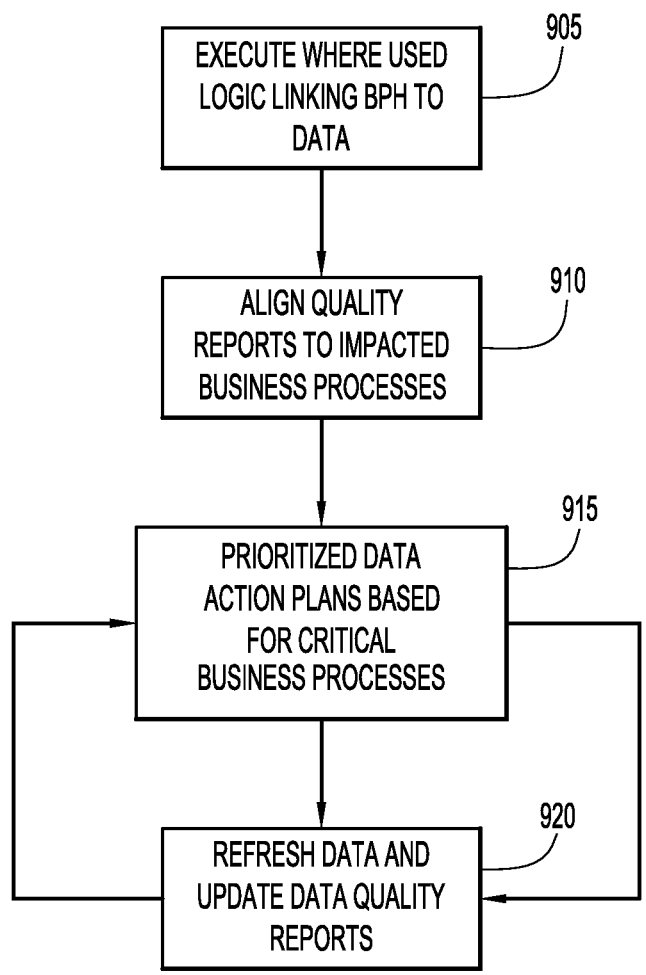
FIG. 9 is a flow diagram illustrating a manner of associating data quality metrics of data domain attributes of source systems with processes of a target system according to an embodiment of the present invention.

A manner of performing the target process phase of data quality analysis including associating data attributes with corresponding business or other processes of a target system (e.g., via data quality profiler module 128, data quality engine 130, linking module 1030 (FIGS. 10A-10B), data quality reports module 132, and one or more server systems 110) according to an embodiment of the present invention is illustrated in FIG. 9, in particular, data attributes of a data domain are associated with business or other processes of the target system at step 905. This may be accomplished by use of the business process hierarchy (BPH) indicating the business or other processes of the target system and the associations between data and processes within metadata repository 134. The target data of the business or other processes may be traced back to the source systems based on the (LS2T) mappings.

Once the target data of the processes has been associated with data from the source systems, the visualizations and/or reports from the source analysis phase are updated (e.g., via data quality reports module 132) based on the association of the data attributes with the business or other processes of the target system at step 910. For example, the visualizations and/or reports may be updated to provide data quality indications of the data attributes of the source data with respect to business or other processes of the target system as described below.

An action plan providing recommended data cleansing activities is generated for the business or other processes, and the data cleansing activities are performed at step 915. The action plan may indicate which data is to be cleansed and the type of cleansing needed. For example, the action plan may be in the form of a listing of records indicating for each record, the data quality or other rules (for the target system) violated, reasons for the violation, and recommended cleansing actions. The cleansing actions may be performed on data within the source systems, staging areas 122, and/or alignment area 124 manually and/or by the data quality engine as described below.

The action plan may be generated by data quality engine 130 (e.g., via one or more server systems 110) based on a rule set. For example, data quality percentage values for a business or other process of the target system may be applied to one or more rules to determine a recommended data cleansing activity for the action plan. Further, a user may analyze the data quality percentage values and determine an action plan and/or the cleansing activities therein.

Further, data quality engine 130 (e.g., via one or more server systems 110) may perform the data cleansing activities indicated in the action plan. For example, the data quality engine may determine appropriate conversions or transformations and transform the corresponding data. Further, the data quality engine may analyze the action plan and correct and/or add data based on the statuses and/or data quality rules violated by the data and indicated in the action plan.

Once the data cleansing activities have been performed, the data quality percentage values for the business or other processes are re-calculated for the cleansed data at step 920, and the visualizations, reports, and action plan are updated based on the revised data quality percentage values. The generation of action plans and cleansing of data at step 915 and re-calculation at step 920 are repeated until the results of the target process phase are satisfactory (e.g., the source data is sufficiently clean for migration to the target system, etc.). For example, the data quality percentage values for the business or other processes of the target system may satisfy corresponding thresholds or other criteria to indicate sufficient cleanliness of the source data.

Figure 10A:
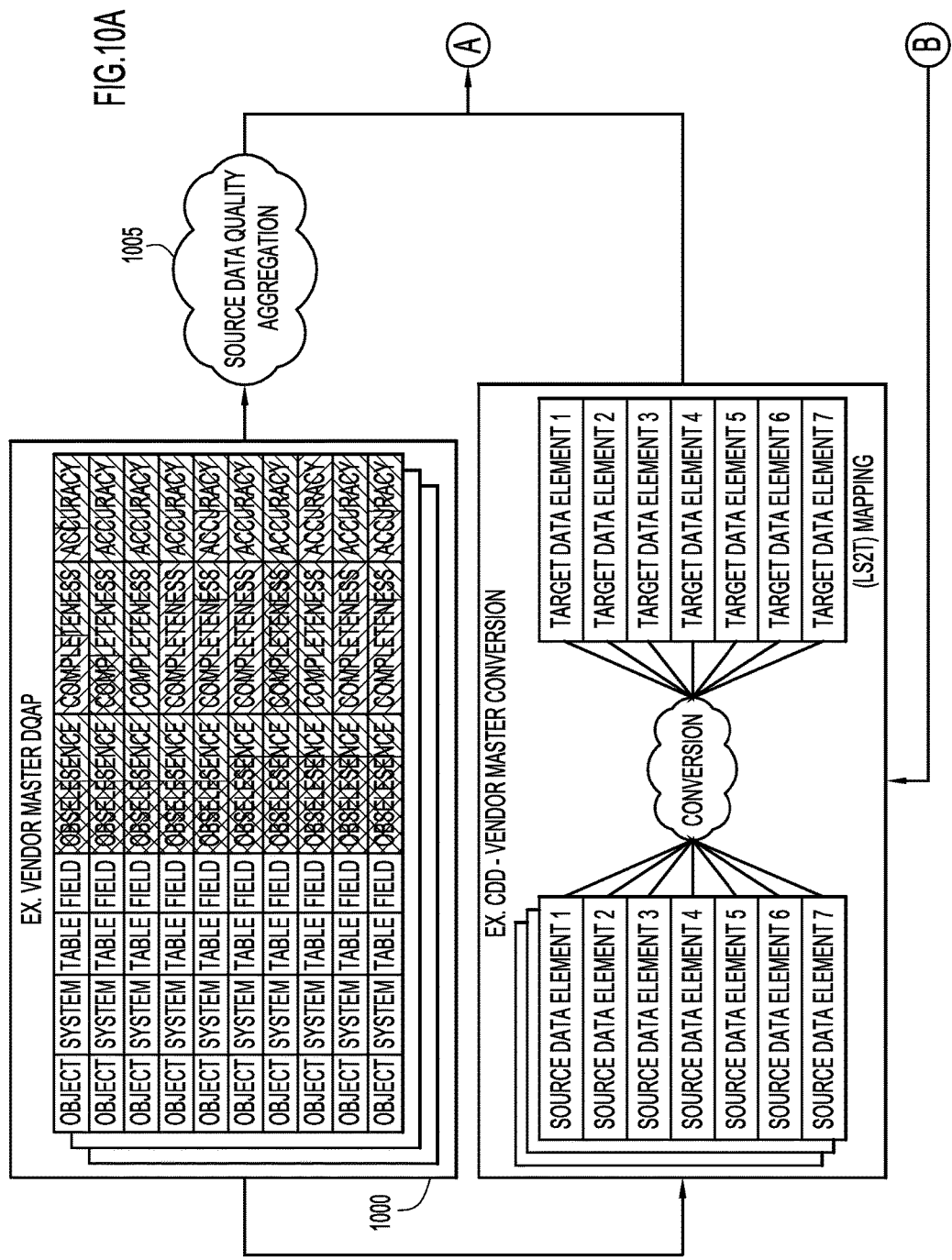
FIGS. 10A-10B are a flow diagram illustrating a manner of determining data quality metrics for source data with respect to processes of a target system according to an embodiment of the present invention.
Figure 10B:
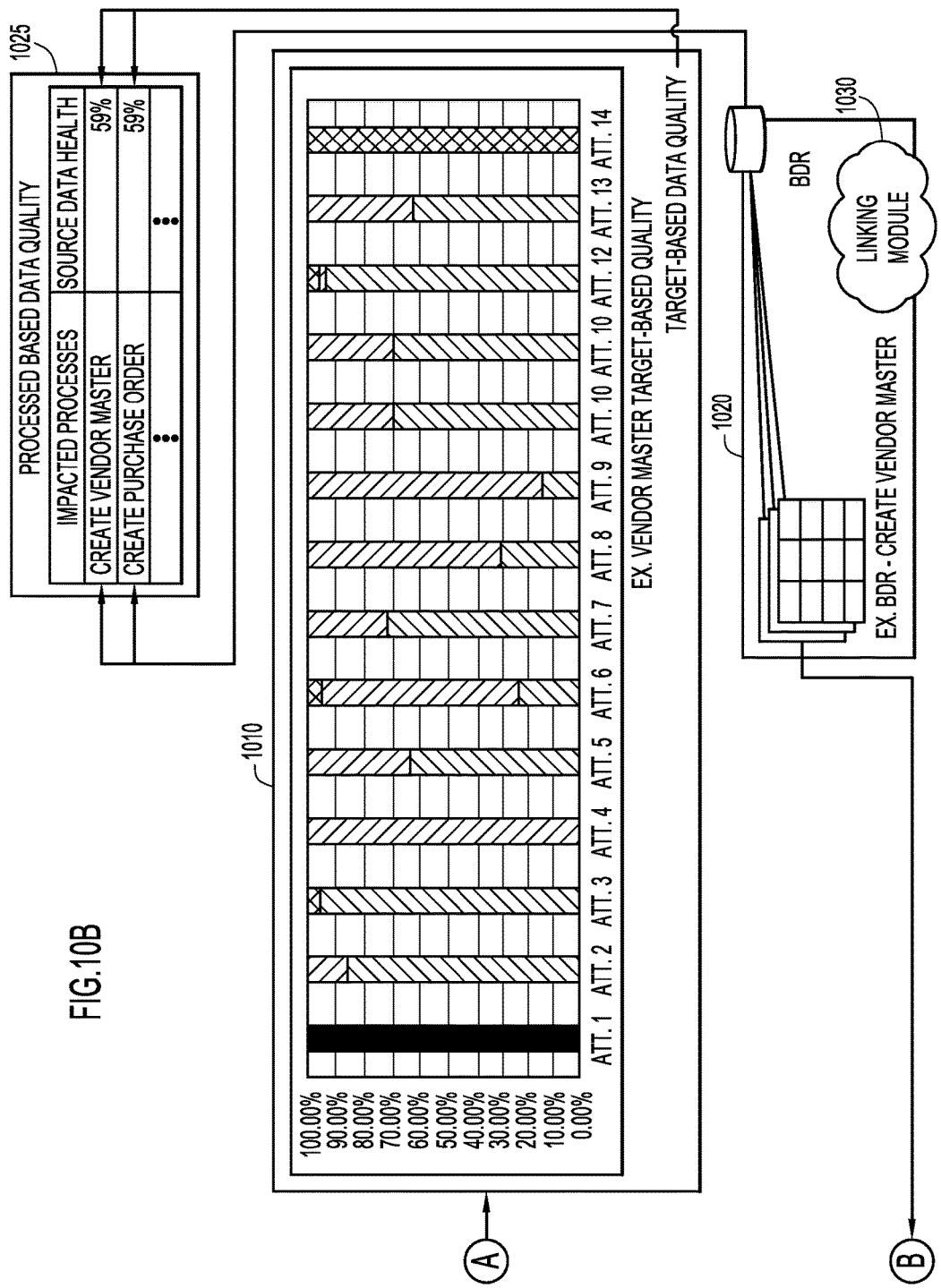

A manner of generating data quality results for business or other processes of the target system during the target process phase (e.g., via data quality profiler module 128, data quality engine 130, data quality reports module 132, linking module 1030, and one or more server systems 110) according to an embodiment of the present invention is illustrated in FIGS. 10A-10B. Initially, data quality percentage values for data attributes of each of the data domains for a source system 140 are generated during the source analysis phase at flow 1000 as described above. Thus, each data domain of a source system is associated with a corresponding set of data quality percentage values as described above (e.g., unweighted matrix 500, weighted matrix 600, flows 705, 725 715, and 735 of FIGS. 5, 6, 7A, 7B).

The data quality percentage values for the data domains are aggregated across source systems 140 during the source analysis phase at flow 1005, and the aggregated data quality percentage values for data attributes of a data domain are utilized to produce overall data quality percentage values during the source analysis phase at flow 1010 as described above. Thus, the source analysis phase produces for each data domain a corresponding set of data quality percentage values aggregated for that data domain across source systems 140 as described above (e.g., flow 745 of FIGS. 7A-7B and chart 852 of FIG. 8).

Data attributes for business or other processes of the target system are associated with data attributes of corresponding data domains of the source data within the target process phase at flow 1020. This may be accomplished (e.g., via linking module 1030) by use of the business process hierarchy (BPH) indicating the business or other processes of the target system and the associations between data and processes within metadata repository 134. A conventional or other tool may be utilized to decompose the business or other processes of target system 150 (based on the business process hierarchy (BPH)) and associate data attributes with those processes. The target data of the business or other processes may be traced back to the source systems based on the (LS2T) mappings (e.g., including conversion rules/processing, etc.) at flow 1015.

The data quality percentage values of the data domains are utilized to produce process based data quality percentage values at flow 1025. For example, a visualization and/or report (e.g., produced by data quality reports module 132 and one or more server systems 110) may indicate each target business or other process and an overall process percentage value indicating data quality for that process. The overall process percentage value for a business or other process of the target system may be calculated in substantially the same manner described above for FIGS. 7A-7B, where the data attributes for the process are treated as the attributes of interest (e.g., with the overall domain percentage value serving as the overall process percentage value). Further, the overall business critical percentage value and/or the overall target based percentage value may be determined for attributes of the target process to indicate data quality of critical or required process attributes (e.g., in the case where some of the process attributes may be optional or not critical).

For example, the overall process percentage value may be calculated by obtaining the quantity of clean data records (e.g., a data record that satisfies each of the data quality dimensions for each of the data attributes of interest in that data record) within the corresponding data domain of the source systems containing the data attributes for that process. Individual quantities for clean data records of data attributes of the corresponding data domain have been previously determined by the source systems in the source analysis phase for computation of the attribute percentage values described above, and the quantities for the data attributes of the process may be combined or summed to produce a combined quantity.

This combined quantity is divided by the total quantity of data records of the corresponding data domain within each of the source systems containing the data attributes for the process. This total quantity may be determined by combining or summing individual total quantities for the data attributes of the process previously determined by the source systems in the source analysis phase for computation of the attribute percentage values for those data attributes. The overall process percentage value is typically normalized to an integer value between zero and one-hundred percent (e.g., rounding, truncation, etc.), but may be any value within any desired value range. For example, the overall process percentage value (OPPV) for a process may be expressed as an integer value of:

$$OPPV = \frac{\text{Total number of clean data records in the domain on the source systems with data attributes of the process}}{\text{Total number of data records in the domain on the source systems with data attributes of the process}} * 100$$

The overall process percentage values for remaining processes of the target system associated with the same or other data domains may be determined in substantially the same manner described above.

The visualization and/or report may be in the form of a table or chart for the target processes as illustrated at flow 1025. By way of example, the table or chart indicates an overall process percentage value of 59% for the target process Create Vendor Master, and an overall process percentage value of 59% for the target process Create Purchase Order. The visualization and/or report may further include the business critical and/or target based percentage values for the data attributes of the process. The visualization and/or report may be utilized to produce action plans for further cleansing of the data as described above. Further, the various data quality percentage values may be compared to thresholds to determine whether further data cleansing should be performed, where cleansing efforts may be prioritized to the processes having greater amounts of actionable data.

Once the source data is sufficiently clean for the business or other processes of the target system, the load analysis phase of the data quality analysis may be performed to validate the data (e.g., within preload area 126) for loading of the data into the target system. During the load analysis phase, data from the common data model of alignment area 124 is converted into the data model of preload area 126 (e.g., via an ETL tool) and profiled by conversion or load object. Data quality engine 130 (e.g., via one or more server systems 110) determines actionable or problematic data based on target system configurations for in-scope (or relevant) data objects (e.g., Customer Master, Material Master, etc.). Reports are generated for each object for migration including a migration determination, and routed to appropriate users and/or administrators by data quality reports module 132 (e.g., via one or more server systems 110). This load analysis phase is typically performed during system integration test (SIT) cycles. At this point, usually 80% to 95% of the data is compliant with target data requirements. The load analysis phase is typically executed once for each integration test cycle, ideally with improved data quality and less process impact each time.

Figure 11:
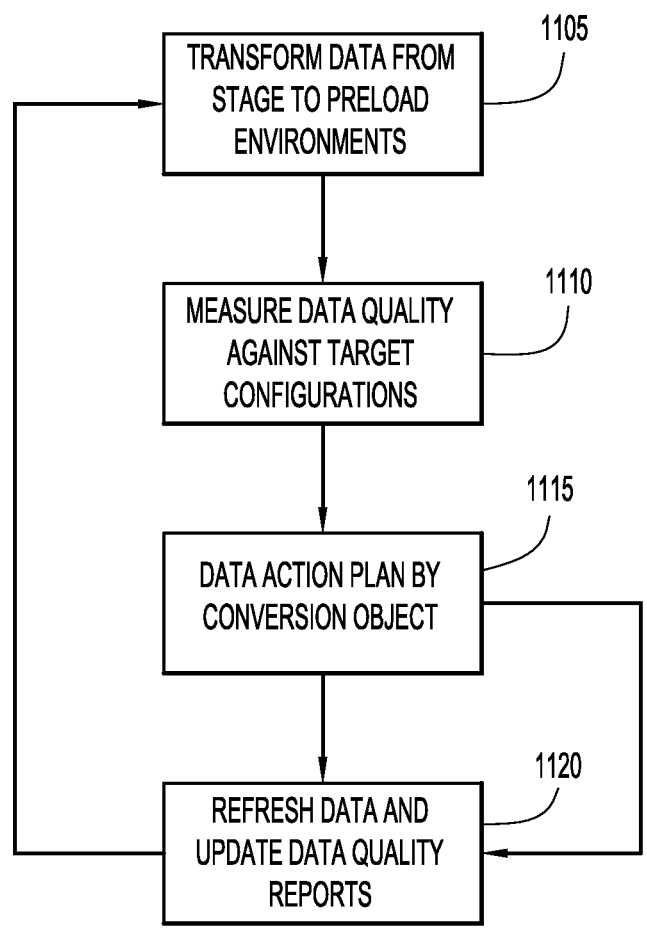
FIG. 11 is flow diagram illustrating a manner of validating quality of the source data for loading into a target system according to an embodiment of the present invention.

A manner of performing the load analysis phase for validating cleansed data for loading into the target system (e.g., via data quality profiler module 128, data quality engine 130, data quality reports module 132 and one or more server systems 110) according to an embodiment of the present invention is illustrated in FIG. 11. Initially, source data from staging areas 122 in source data models is transformed for storage in the target data model of preload area 126 (e.g., via transformations through alignment area 124) at step 1105. The data quality of the source data is validated against the requirements of the target system at step 1110. This may be accomplished by data quality profiler module 128 (e.g., via one or more server systems 110) applying the transformed source data to rules of the target system, and storing results of the rule comparisons (e.g., in the form of a load log, counts of data records compliant/ non-compliant with the target rules, etc.). The rules for the target system may be defined by users and/or administrators (e.g., manually and/or via a computerized tool) and retrieved from the target system for the analysis.

Data quality engine 130 (e.g., via one or more server systems) determines load percentage values for load objects. In particular, data in preload area 126 is grouped into load objects for loading within target system 150. Each load object includes various data attributes or fields and a quantity of corresponding records or table portions. The load percentage value for a load object is determined by obtaining the quantity of clean data records within the load object satisfying the rules of the target system. This quantity is divided by the total quantity of data records in the load object. The load percentage value is typically normalized to an integer value between zero and one-hundred percent (e.g., rounding, truncation, etc.), but may be any value within any desired value range. For example, the load percentage value (LPV) for a load object may be expressed as an integer value of:

$$LPV = \frac{\text{Total Number of clean data records of a load object}}{\text{Total number of data records of the load object}} * 100$$

The load percentage values for remaining load objects may be determined in substantially the same manner described above. The various quantities may be determined by analyzing the load log and/or from the data record counts described above.

A visualization and/or report may be produced (e.g., via data quality reports module 132 an done or more server systems 110) in the form of a table or chart for load objects as illustrated in FIG. 12. By way of example, the table or chart indicates a load percentage value of 64% for load object 1, and a load percentage value of 73% for load object 2. The visualization and/or report may be utilized to produce action plans for further cleansing of the data as described below. Further, the various load percentage values may be compared to thresholds to determine whether further data cleansing should be performed, where cleansing efforts may be prioritized to the load objects having greater amounts of actionable data.

Referring back to FIG. 11, an action plan providing actionable data and recommended data cleansing or transformation activities is generated, and the data cleansing or transformation activities are performed at step 1115. The action plan may indicate which data is to be cleansed or transformed and the type of cleansing or transformation needed. For example, the action plan may be in the form of a listing of records indicating for each record, the rules (for the target system) violated, reasons for the violation, and recommended cleansing actions. The cleansing actions may be performed on data within the source systems, staging areas 122, alignment area 124, and/or preload area 126 manually and/or by the data quality engine as described below.

The action plan may be generated by data quality engine 130 (e.g., via one or more server systems 110) based on a rule set. For example, the results of the target rule comparisons to the source data may be applied to one or more rules to determine a recommended data cleansing activity (e.g., transformation, etc.) for the action plan. Further, a user may analyze visualized data quality percentage values and determine an action plan and/or the cleansing activities therein. Further, data quality engine 130 (e.g., via one or more server systems 110) may perform the data cleansing activities indicated in the action plan. For example, the data quality engine may determine appropriate conversions or transformations and transform the corresponding data. Moreover, the data quality engine may analyze the action plan and correct and/or add data based on the target rules violated by the data and indicated in the action plan.

Once the data cleansing or transformation activities have been performed, the data validation is performed and results re-calculated for the cleansed or transformed data at step 1120. The visualizations, reports, and action plan are updated based on the validation. The generation of action plans and cleansing or transformation of data at step 1115 and re-calculation at step 1120 are repeated until the results of the load analysis phase are satisfactory (e.g., the source data is sufficiently clean for loading to the target system, etc.). For example, the validation results may satisfy corresponding thresholds or other criteria to indicate sufficient cleanliness of the source data for loading into the target system.

The data quality reports of present invention embodiments may serve as catalysts for data migration projects. An audit of these reports addresses an overall health and relevancy of source systems with respect to migration of data to new enterprise software (e.g., CRM, etc.). The information provided by present invention embodiments is fact-based, and can be addressed immediately while supporting the business strategy and scoping guidelines for the data migration. This enables initiation of a short-term data cleansing effort in the source systems based on long-term data governance for new systems.

It will be appreciated that the embodiments described above and illustrated in the drawings represent only a few of the many ways of implementing embodiments for data quality analysis and cleansing of source data with respect to a target system.

The environment of the present invention embodiments may include any number of computer or other processing systems (e.g., client or end-user systems, server systems, source systems, target systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, database management system, analysis modules, data quality profiler module, data quality engine, data quality reports module, linking module, ETL or other tools, etc.). These systems may include any types of monitors and input devices (e.g., keyboard, mouse, voice recognition, etc.) to enter and/or view information.

It is to be understood that the software (e.g., analysis modules, data quality profiler module, data quality engine, data quality reports module, linking module, etc.) of the present invention embodiments may be implemented in any desired computer language and could be developed by one of ordinary skill in the computer arts based on the functional descriptions contained in the specification and flow diagrams or charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client, source, target, and server systems, and/or any other intermediary processing devices. The software and/or algorithms described above and illustrated in the flow diagrams or charts may be modified in any manner that accomplishes the functions described herein. In addition, the functions in the flow diagrams or charts or description may be performed in any order that accomplishes a desired operation.

The software of the present invention embodiments (e.g., analysis modules, data quality profiler module, data quality engine, data quality reports module, linking module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information (e.g., cleansing data, transformation data, matrices, data quality metric scores, data from the source systems, data models, etc.). The database and metadata repository may be implemented by any number of any conventional or other databases, data stores or storage structures (e.g., files, databases, data structures, data or other repositories, etc.) to store information (e.g., cleansing data, transformation data, matrices, data quality metric scores, data from the source systems, data models, business or other metadata, mappings, etc.). The database and/or metadata repository may be included within or coupled to the server, source, target, and/or client systems. The database and/or metadata repository may be remote from or local to the computer or other processing systems, and may store any desired data (e.g., cleansing data, transformation data, matrices, data quality metric scores, data from the source systems, data models, business or other metadata, mappings, etc.).

The source or other data may be arranged within the database in any desired fashion for migration to the target system. For example, the database may include any quantity of areas (e.g., staging, alignment, preload, etc.) to store, process, and/or migrate the data. The areas may each be of any quantity, include any suitable storage capacity, store any desired data, and employ any data models (e.g., source, target, or other data model, etc.). The mappings may include any desired information to link data items (e.g., attributes, records, data objects, etc.) between source and target systems in any direction (e.g., source to target, target to source, through intermediary devices, etc.).

The data quality analysis may employ any quantity of any desired data quality dimensions. The data quality dimensions may each employ any quantity of any desired data quality or other metrics. Any quantity of the data quality dimensions and/or metrics may be utilized to determine clean or actionable data. For example, data quality rules for a data object or attribute may span any quantity of data quality dimensions or metrics, where any desired quantity of rules satisfied (or violated) may determine clean (or actionable) data. Further, the data quality rules may be of any quantity, and be associated with one or more particular data objects and a corresponding system (e.g., source, target or other system, etc.). The action plans for the individual phases may include any desired information (e.g., listing of problematic or clean data items, violated rules, cleansing actions, etc.). Any portions of action plans may be generated and/or executed manually and/or automatically (e.g., via a computer system without user intervention).

The data quality scores may be in any desired form (e.g., percentage values, integer and/or real numbers, an indicator representing data quality, etc.), and may be normalized within any desired value range. The scores may be based on quantities of any suitable data items or objects (e.g., records, fields, data objects comprising a plurality of data items, etc.).

The statuses may include any desired indicators or labels, and may be used to indicate data quality and/or actions for the data. The statuses may be used and/or updated during any portion of the data quality analysis or migration. The weighted and unweighted matrices may be in any desired form and include any desired information (e.g., any quantity of data quality dimensions, data items (e.g., attributes, data objects, etc.), etc.). The business critical and target based weights may include any desired values or indicators. Further, the weights may be utilized to designate data items for any association with the target or source systems (e.g., required, critical, optional, etc.).

The individual phases of the data quality analysis may be repeated any quantity of times until data is sufficiently cleansed. The thresholds for data quality scores may include any values indicating sufficient cleanliness or dirtiness of the data (e.g., threshold percentages (e.g., 60%, 70%, greater than (or equal to) a certain percentage, etc.) for clean data, threshold percentages for dirty data (e.g., 20%, 30%, less than (or equal to) a certain percentage, etc.), etc.) to determine whether further data cleansing should be performed. The individual phases of the data quality analysis may be performed serially and/or in parallel during any portion of the data migration.

The present invention embodiments may employ any number of any type of user interface (e.g., Graphical User Interface (GUI), command-line, prompt, etc.) for obtaining or providing information (e.g., data quality scores, action plans with recommended cleansing actions and data identified for cleansing, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The reports may include any information arranged in any fashion, and may be configurable based on rules or other criteria to provide desired information to a user (e.g., data quality scores, action plans with recommended cleansing actions and data identified for cleansing, etc.).

The present invention embodiments are not limited to the specific tasks or algorithms described above, but may be utilized for data quality analysis and cleansing of data for any suitable purpose (e.g., data for use with an application, analysis of data residing within a data warehouse, data on a system receiving new software, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the an without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of transferring data between one or more source systems and a target system comprising:
    determining a domain score for one or more data domains of source data from the one or more source systems based on one or more data quality metrics for the target system, wherein the domain score provides an indication of data quality of the source data with respect to compliance with data requirements of the target system;
    identifying one or more corresponding processes of the target system utilizing the source data for the one or more data domains and determining a process score for the one or more identified processes based on a corresponding domain score, wherein the process score indicates data quality of the source data utilized by the identified processes with respect to compliance with the data requirements of the target system;
    cleansing the source data based on one or more from a group of the domain score and process score; and
    validating the cleansed source data against the target system for transference to the target system.

2. The computer-implemented method of claim 1, wherein determining a domain score for one or more data domains includes:
    measuring attributes of data records of the one or more data domains against the one or more data quality metrics for the target system;
    determining a total data quality measurement for a data domain based on the attribute measurements for source data within that data domain;
    providing weights for the attributes based on the attributes being critical to and required for the target system; and
    applying the weights to the total data quality measurement for the data domain, wherein the domain score for the data domain is based on the weighted total data quality measurement for that data domain.

3. The computer-implemented method of claim 2, wherein the domain score is determined for a data domain by combining the total data quality measurements for the data domain across the one or more source systems.

4. The computer-implemented method of claim 1, wherein determining a domain score for one or more data domains includes:
    mapping attributes of the source data to target data of the target system and determining a status for each mapped attribute, wherein the status indicates data cleansing for that attribute.

5. The computer-implemented method of claim 4, wherein cleansing the source data further includes:
    updating the status of the mapped attributes based on the cleansed source data.

6. The computer-implemented method of claim 1, further comprising:
    generating an action plan for cleansing the source data based on measurements of attributes of data records of the one or more data domains against the one or more data quality metrics for the target system, wherein the action plan indicates problematic data and a corresponding cleansing action.

7. The computer-implemented method of claim 1, wherein validating the cleansed source data includes:
applying the cleansed source data to one or more data rules for the target system to validate the cleansed source data for transference to the target system.

* * * * *